United States Patent [19]
Suzuki

[11] Patent Number: 6,025,962
[45] Date of Patent: Feb. 15, 2000

[54] ZOOM LENS WITH AN ANTI-VIBRATION FUNCTION

[75] Inventor: Kenzaburo Suzuki, Yokohama, Japan

[73] Assignee: Nikon Corporation, Tokyo, Japan

[21] Appl. No.: 08/926,800

[22] Filed: Sep. 10, 1997

[30] Foreign Application Priority Data

Sep. 12, 1996 [JP] Japan ................................. 8-265262
Oct. 7, 1996 [JP] Japan ................................. 8-286146
Oct. 7, 1996 [JP] Japan ................................. 8-286147

[51] Int. Cl.$^7$ ........................................... G02B 9/60
[52] U.S. Cl. ........................... 359/766; 359/764; 359/557
[58] Field of Search ................................. 359/766, 764, 359/763, 557

[56] References Cited

U.S. PATENT DOCUMENTS

| | | | |
|---|---|---|---|
| 4,235,521 | 11/1980 | Imai | 359/766 |
| 4,451,125 | 5/1984 | Sato | 359/766 |
| 5,502,594 | 3/1996 | Suzuki et al. | 359/557 |
| 5,585,969 | 12/1996 | Endo | 359/766 |
| 5,642,224 | 6/1997 | Suzuki | 359/557 |
| 5,760,957 | 6/1998 | Suzuki | 359/557 |
| 5,774,267 | 6/1998 | Kodama et al. | 359/557 |
| 5,781,348 | 7/1998 | Ohtake | 359/557 |

*Primary Examiner*—Loha Ben
*Attorney, Agent, or Firm*—Michael N. Meller

[57] ABSTRACT

A zoom lens system with an anti-vibration function, which is provided with, in order from the object end: a first lens group having a positive refractive power, a second lens group having a negative refractive power, a third lens group having a positive refractive power, a fourth lens group having a negative refractive power, and a fifth lens group having a positive refractive power, and whose focal length at the wide-angle end is shorter than the diagonal width of the image plane of the zoom lens system, at least one lens group selected from the first lens group and the fifth lens group moves toward the object end and all of the distances between each of the lens groups are changed when zooming from the wide-angle end to the telephoto end. At least one lens group selected from the second, third, and fourth lens groups moves in a direction substantially perpendicular to the optical axis of the zoom lens system when preventing vibration.

25 Claims, 18 Drawing Sheets

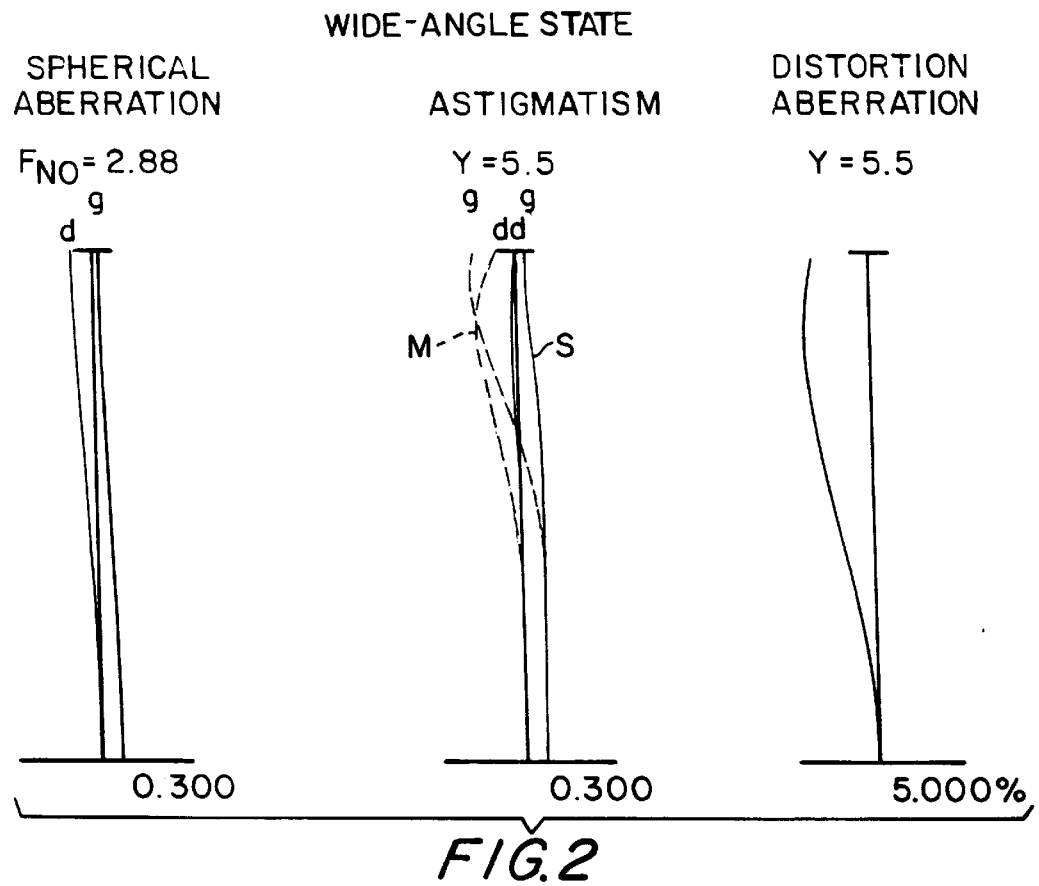
*FIG.2*
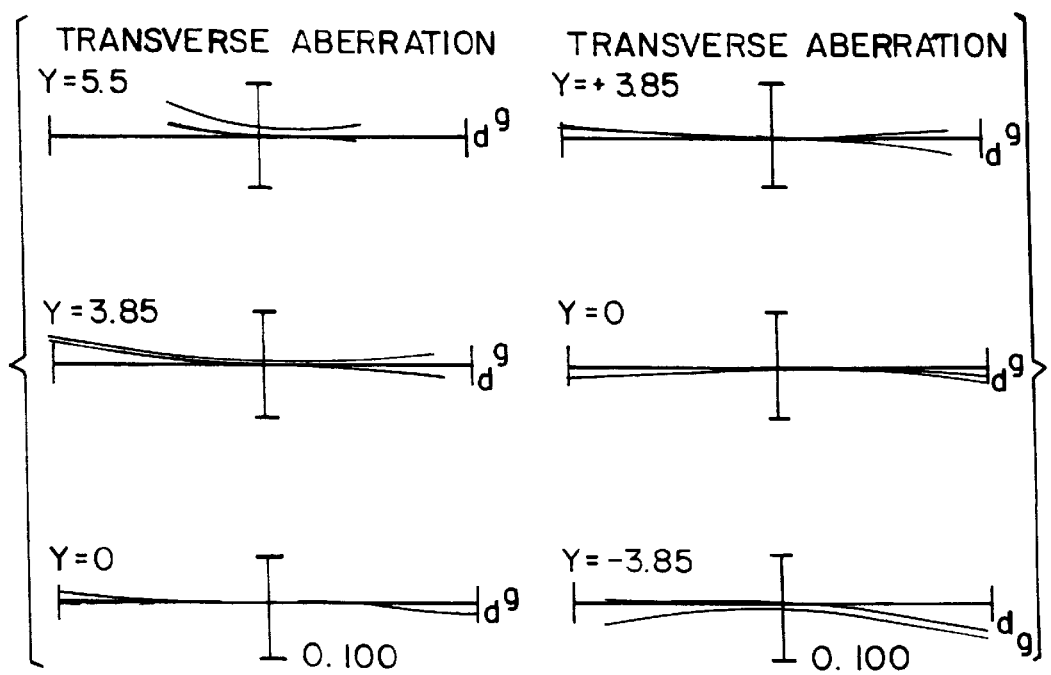
*FIG.2A*     *FIG.2B*

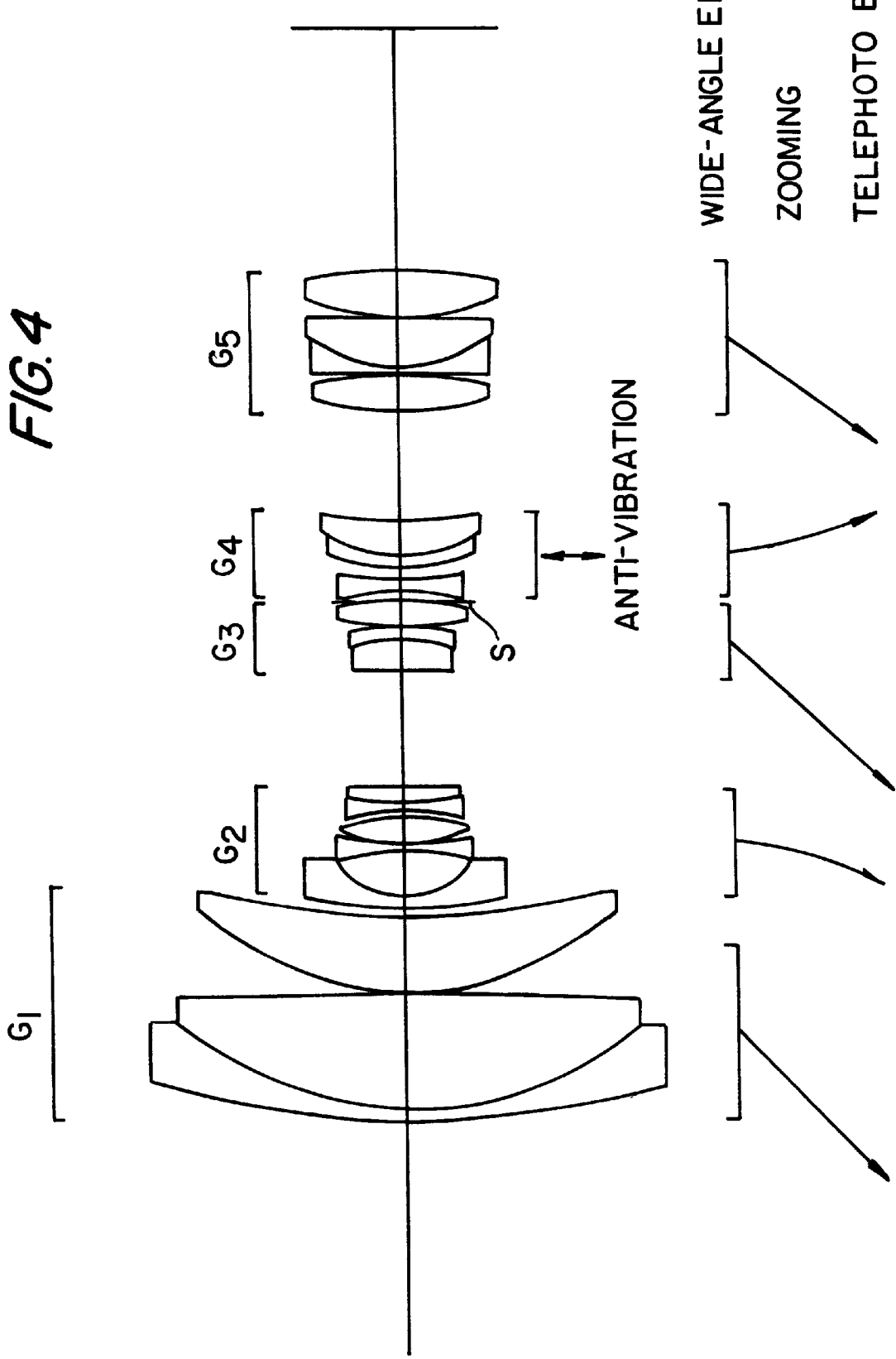

WIDE ANGLE STATE
| SPHERICAL ABERRATION | ASTIGMATISM | DISTORTION ABERRATION |
|---|---|---|
| $F_{NO}=2.88$ | $Y=5.5$ | $Y=5.5$ |
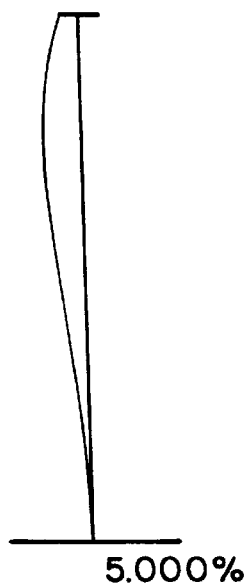
0.300  0.300  5.000%
FIG.5
TRANSVERSE ABERRATION          TRANSVERSE ABERRATION
Y=5.5                          Y=+3.85
         
Y=3.85                         Y=0
         
Y=0                            Y=-3.85
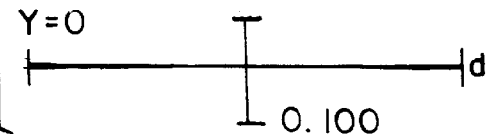         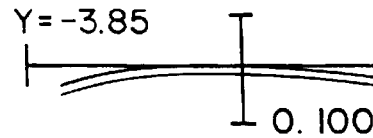
0.100                          0.100
FIG.5A         FIG.5B

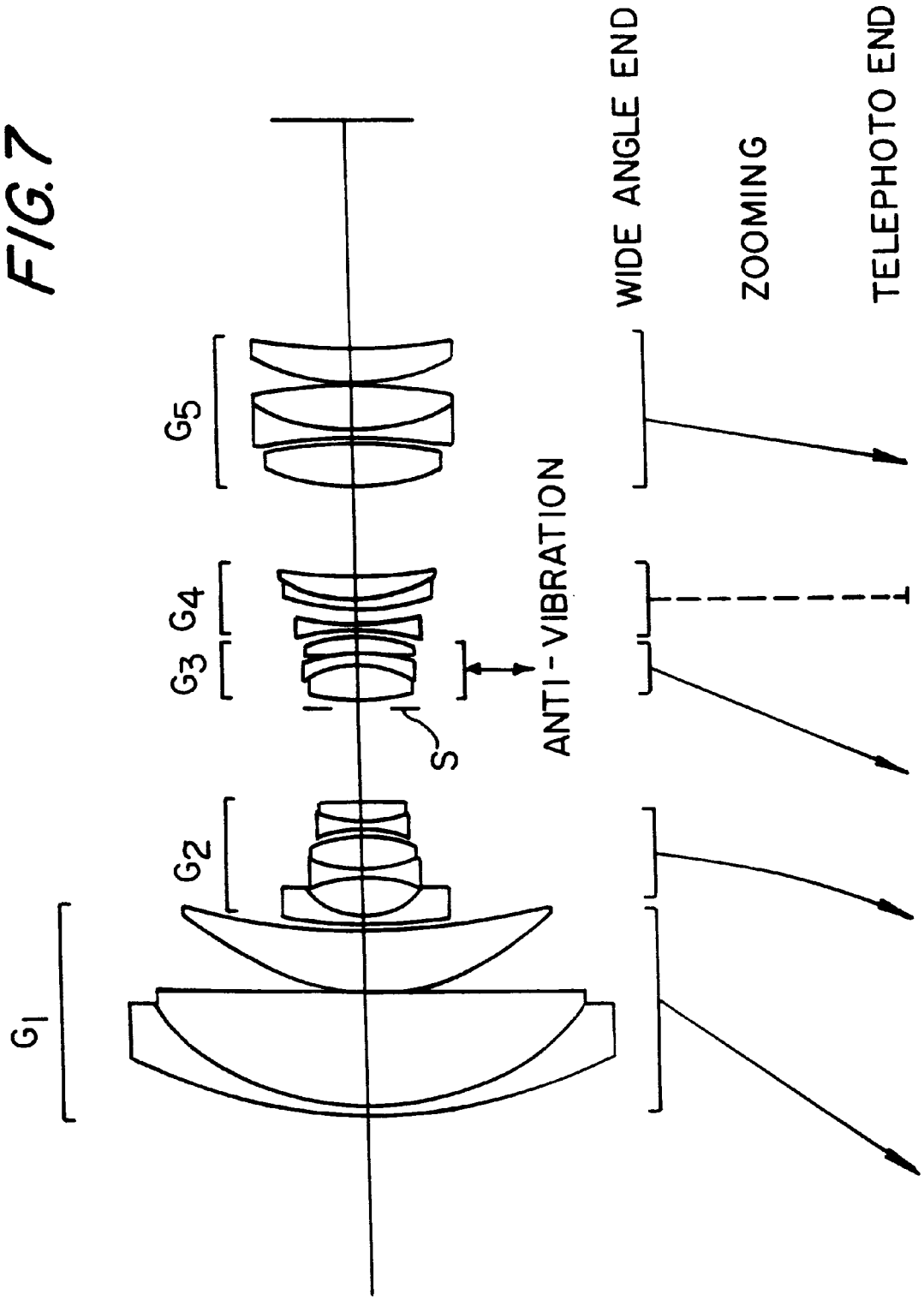

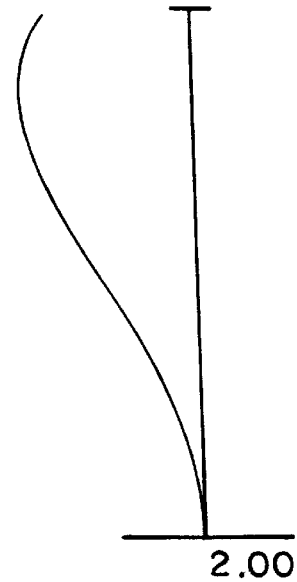
WIDE-ANGLE STATE
SPHERICAL ABERRATION
$F_{NO}= 2.90$
ASTIGMATISM
$Y = 5.50$
DISTORTION ABERRATION
$Y = 5.50$
FIG.8
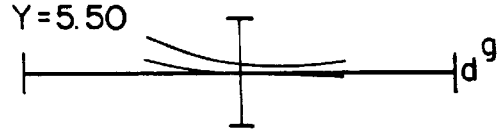
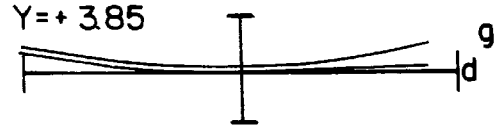
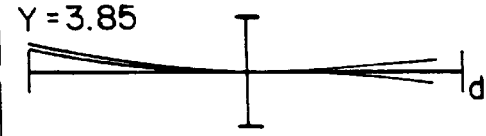
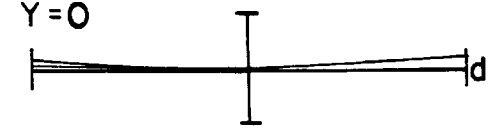
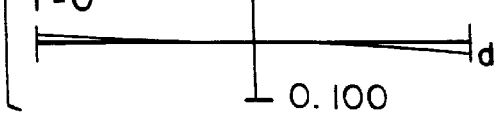
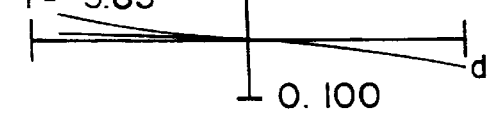
FIG.8A  FIG.8B TELEPHOTO STATE
| SPHERICAL ABERRATION | ASTIGMATISM | DISTORTION ABERRATION |
|---|---|---|
| $F_{NO}=2.91$ | $Y=5.50$ | $Y=5.50$ |
 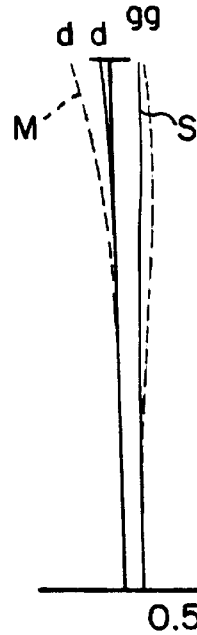 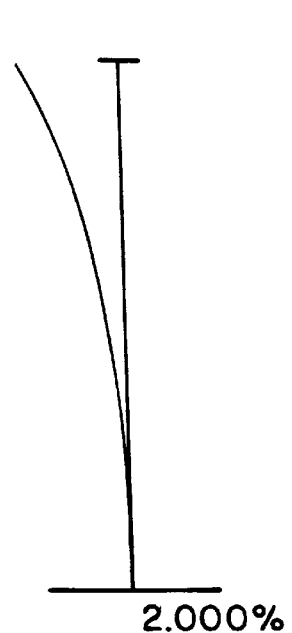
0.500    0.500    2.000%
FIG. 9
| TRANSVERSE ABERRATION | TRANSVERSE ABERRATION |
|---|---|
| $Y=5.50$ | $Y=+3.85$ |
 
$Y=3.85$    $Y=0$
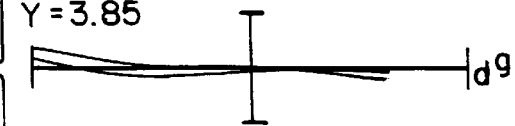 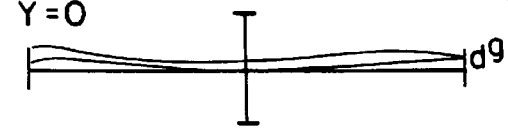
$Y=0$    $Y=-3.85$
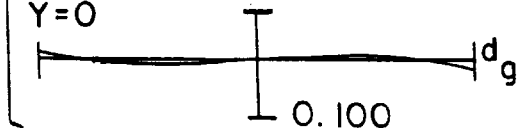 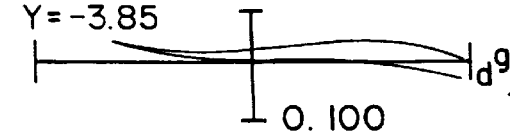
0.100    0.100
FIG. 9A    FIG. 9B WIDE ANGLE STATE
| SPHERICAL ABERRATION | ASTIGMATISM | DISTORTION ABERRATION |
|---|---|---|
| $F_{NO}=2.43$ | $Y=5.50$ | $Y=5.50$ |
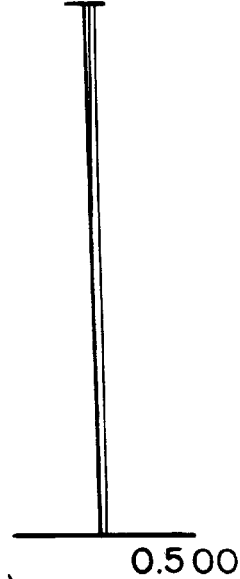
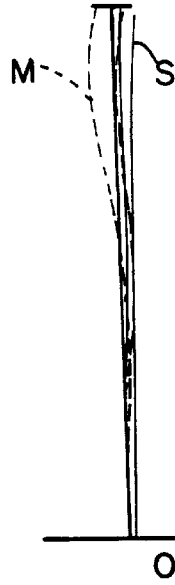
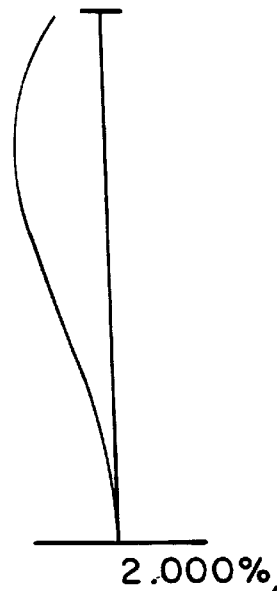
0.500   0.500   2.000%
FIG.11
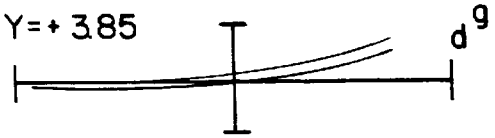
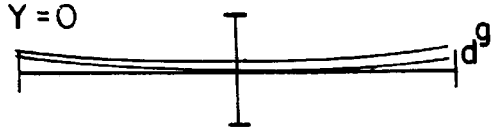
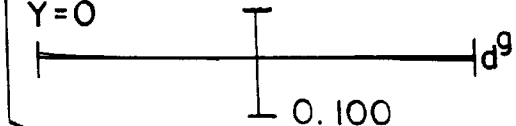
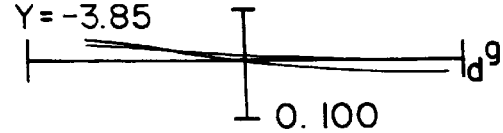
FIG.11A   FIG.11B

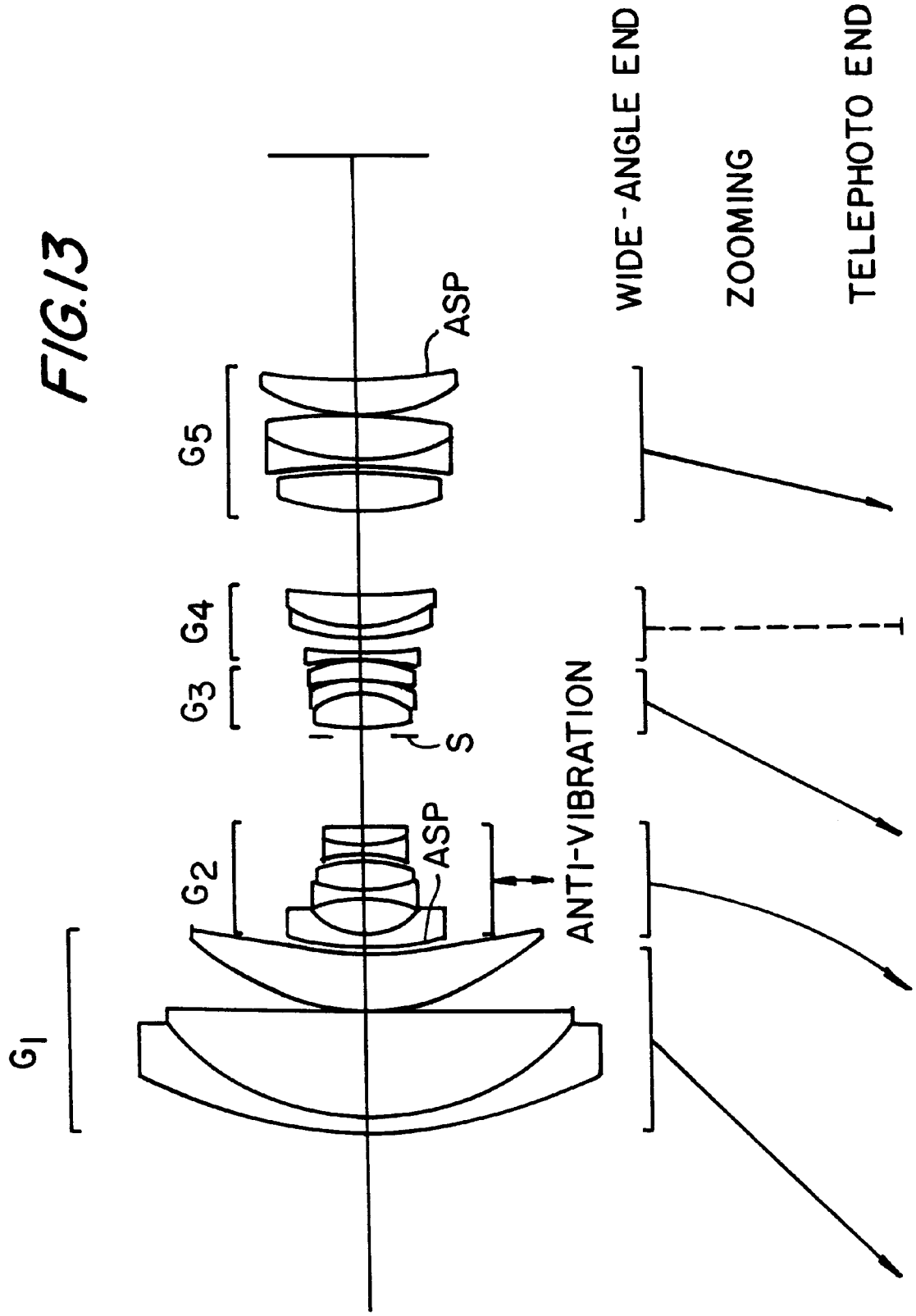

WIDE-ANGLE STATE
| SPHERICAL ABERRATION | ASTIGMATISM | DISTORTION ABERRATION |
|---|---|---|
| $F_{NO}= 2.88$ | $Y = 5.50$ | $Y = 5.50$ |
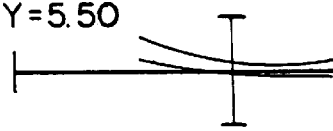
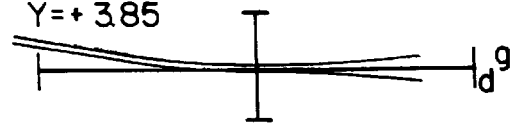
*FIG. 14*
TRANSVERSE ABERRATION
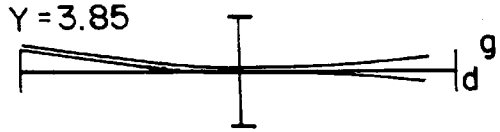
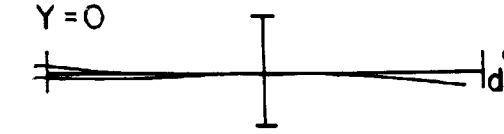
*FIG.14A*     *FIG.14B*

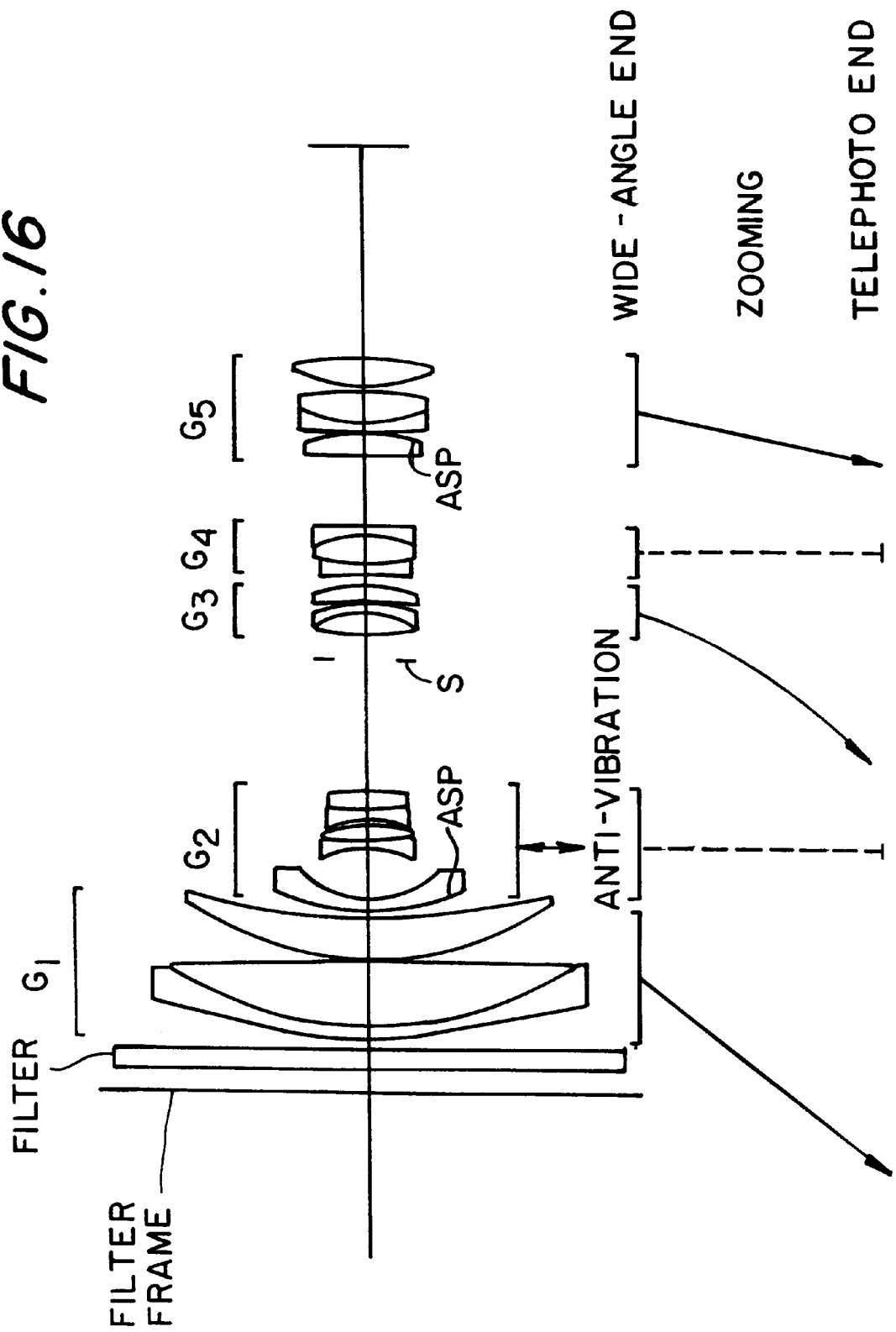

TELEPHOTO STATE
| SPHERICAL ABERRATION | ASTIGMATISM | DISTORTION ABERRATION |
|---|---|---|
| $F_{NO}=2.90$ | $Y=5.50$ | $Y=5.50$ |
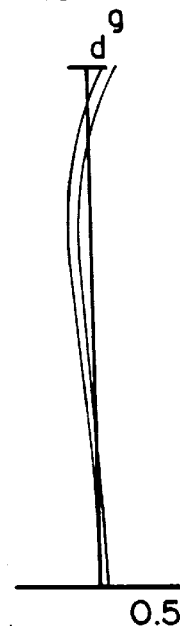  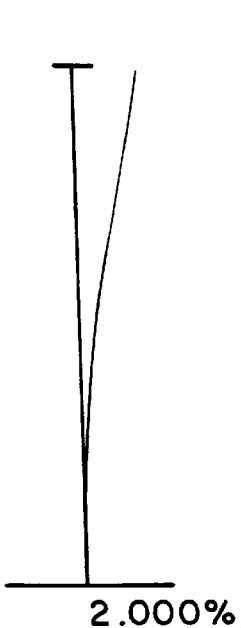
0.500     0.500     2.000%
*FIG.18*
TRANSVERSE ABERRATION     TRANSVERSE ABERRATION
$Y=5.50$     $Y=+3.85$
 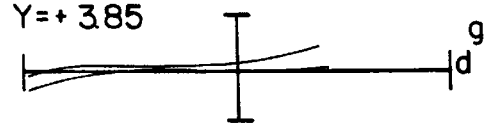
$Y=3.85$     $Y=0$
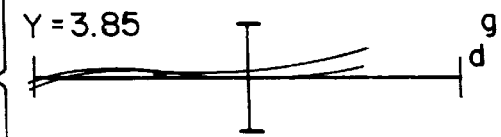 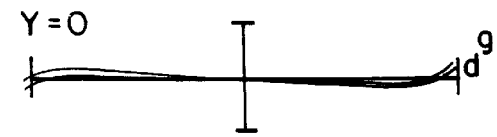
$Y=0$     $Y=-3.85$
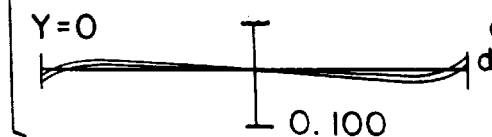 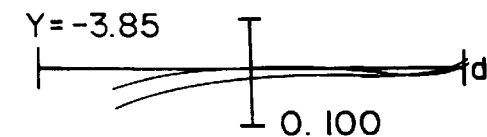
0.100     0.100
*FIG.18A*     *FIG.18B*

ZOOM LENS WITH AN ANTI-VIBRATION FUNCTION

The present invention relates to a zoom lens system. More particularly, the present invention relates to anti-vibration technology for a high-zoom ratio lens system, including those with a wide field of view.

BACKGROUND OF THE INVENTION

Zoom lens systems provided with an anti-vibration function are disclosed in Japanese Laid-Open Patent Application Nos. 6-337375 and 6-123836. In a zoom lens system consisting of five or more lens groups, these systems have the second lens group, third lens group, etc. intersect the optical axis and vary their positions to prevent vibration.

Nevertheless, each of the zoom lens systems described in the aforesaid publications is primarily a telephoto zoom lens system, and the field of view at the wide-angle end is smaller than 30 degrees. Furthermore, the effective F number is large-about F/4-F/5.6-so that under bright conditions the picture goes black and this is not sufficient for photographing dark subjects. Instead of this, what has long been needed is a large-aperture, wide-angle, high-zoom ratio, high-performance, anti-vibration optical system for a zoom lens.

Also, optical systems utilized for electronic imaging devices and so forth often position optical low-pass filters or three-color separation filters, mirrors, etc. behind the lens, so that a sufficiently large back focus is also required.

It is also necessary to provide sufficient peripheral illumination at the periphery of the image plane in order to minimize shading, and to maintain sufficient telecentricity at the image side.

SUMMARY OF THE INVENTION

It is accordingly an object of the present invention to overcome the problems developed by prior solutions.

It is a further object to provide a high-performance zoom lens system having an anti-vibration function that has a large-aperture, wide field of view, has a high-zoom ratio, has a sufficiently long back focus, and has a sufficiently high telecentricity at the image side.

In a preferred embodiment of the present invention, a zoom lens system is provided having, in order from the object side:

a first lens group having a positive refractive power, a second lens group having a negative refractive power, a third lens group having a positive refractive power, a fourth lens group having a negative refractive power, and a fifth lens group having a positive refractive power, and whose focal length at the wide-angle end is shorter than the diagonal width of the image plane. At least one lens group selected from the first and fifth lens groups moves toward the object end of the zoom lens system and all of the distances between each of the lens groups are changed when zooming from the wide-angle end to the telephoto end. Furthermore, at least one lens group selected from the second, third, or fourth lens groups moves in a direction substantially perpendicular to the optical axis when preventing vibration.

In another preferred embodiment, at least the fifth lens group moves toward the object end, and the third lens group moves in a direction substantially perpendicular to the optical axis when preventing vibration.

In a further preferred embodiment, the fifth lens group moves toward the object end and the second lens group moves in a direction substantially perpendicular to the optical axis to prevent vibration.

BRIEF DESCRIPTION OF THE DRAWINGS

The above and other objects, features, and advantages of the present invention will become more apparent from the following detailed description taken with the accompanying drawings, in which:

FIG. 2 hows various aberration diagrams in the wide-angle state of the first embodiment;

FIG. 4 is a drawing showing the structure of the zoom lens system according to a second embodiment of the present invention;

FIG. 5 shows various aberration diagrams in the wide-angle state of the second embodiment;

FIG. 7 is a drawing showing the structure of the zoom lens system according to a third embodiment of the present invention;

FIG. 8 shows various aberration diagrams in the wide-angle state of the third embodiment;

FIG. 9 shows various aberration diagrams in the telephoto state of the third embodiment;

FIG. 11 shows various aberration diagrams in the wide-angle state of the fourth embodiment;

FIG. 13 is a drawing showing the structure of the zoom lens system according to a fifth embodiment of the present invention;

FIG. 14 shows various aberration diagrams in the wide-angle state of the fifth embodiment;

FIG. 16 is a drawing showing the structure of the zoom lens system according to a sixth embodiment of the present invention;

FIG. 18 shows various aberration diagrams in the telephoto state of the sixth embodiment.

DESCRIPTION OF THE PREFERRED EMBODIMENTS

Figure 1:
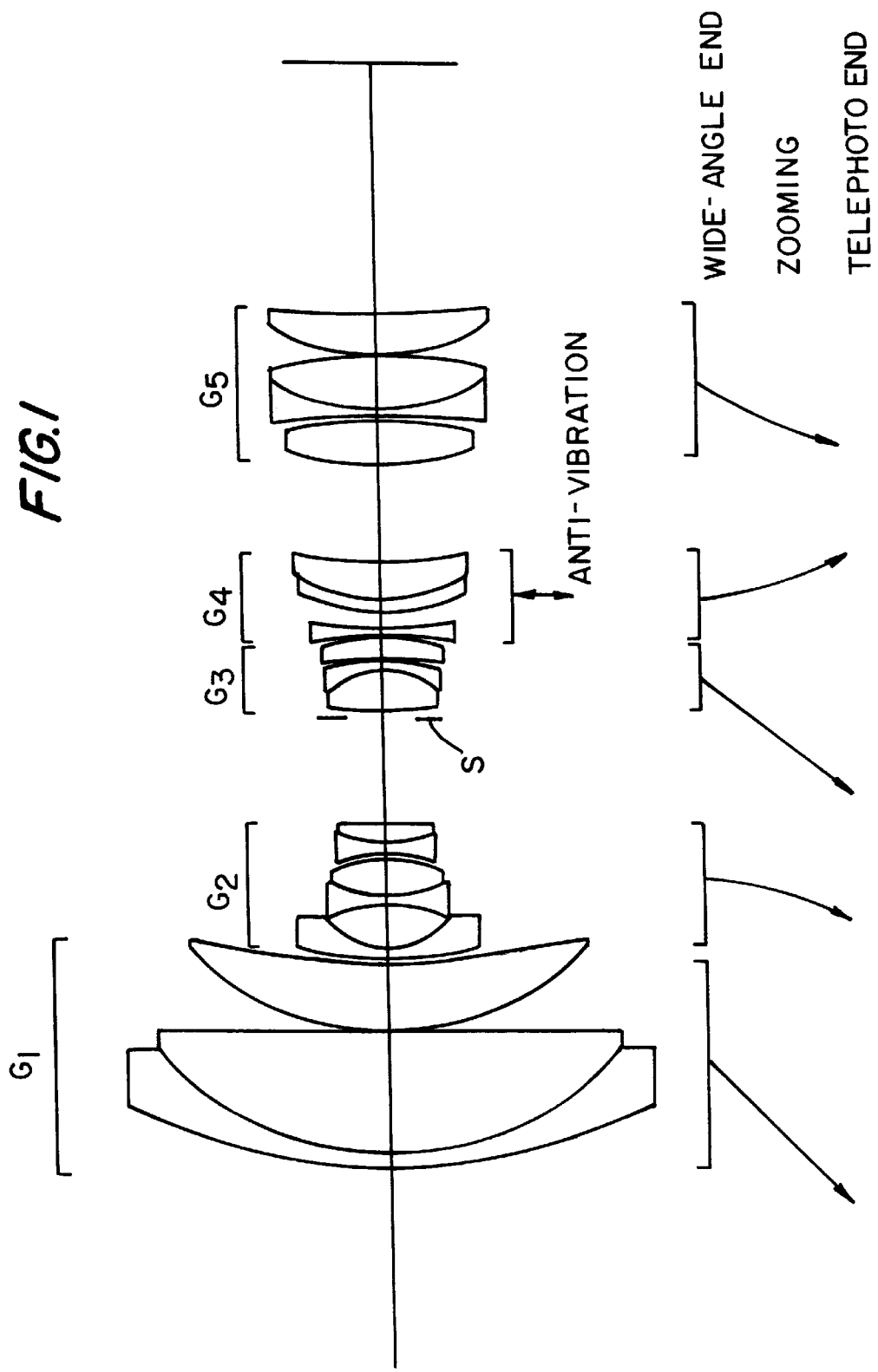
FIG. 1 is a drawing showing the structure of the zoom lens system according to a first embodiment of the present invention.

The embodiments of the present invention will be explained based on the attached drawings. FIGS. 1, 4, 7, 10, 13, and 16 are drawings, respectively showing the lens structure of zoom lens systems according to the first, second, third, fourth, fifth, and sixth embodiments of the present invention.

The zoom lens system in each embodiment comprises, in order from the object side, a first lens group $G_1$ having a positive refractive power, a second lens group $G_2$ having a negative refractive power, a third lens group $G_3$ having a positive refractive power, a fourth lens group $G_4$ having a negative refractive power, and a fifth lens group $G_5$ having a positive refractive power. The focal length $f_W$ at the wide-angle end is shorter than the diagonal width of the image plane of the zoom lens system.

Zooming from the wide-angle end to the telephoto end is accomplished by moving at least one lens group selected from the first lens group $G_1$ and the fifth lens group $G_5$ toward the object end while simultaneously changing all of the distances between each of lens groups $G_1$ through $G_5$, as shown by the arrows of movement in FIGS. 1, 4, 7, 10, 13, and 16.

Anti-vibration correction is accomplished by moving at least one lens group in a direction substantially perpendicular to the optical axis. In the first and second embodiments, the fourth lens group $G_4$ is so moved. In the third and fourth embodiments, the lens group $G_3$ is so moved, and in the fifth and sixth embodiments, the lens group $G_2$ is so moved for anti-vibration purposes. In the third and fifth embodiments, the fourth lens group $G_4$ is fixed when zooming, while in the fourth embodiment all of the lens groups move when zooming. In the sixth embodiment, the second lens group $G_2$ and the fourth lens group $G_4$ are fixed when zooming. The label "ASP" in FIGS. 13 and 16 indicates an aspheric lens surface.

The features and advantages of this type of zoom lens system will be briefly explained. First and foremost, the features of this multigroup structure or five-group structure are fully realized, so imaging performance is excellent and it is possible to provide a zoom lens system which can also be used at high magnification. At the wide-angle end, it is possible to have an arrangement which decreases the distance between the lens groups so that the total length of the system at the wide-angle end is short and a compact structure is possible. The multigroup structure allows a great deal of freedom in lens group movement when zooming, and good imaging performance is also maintained at intermediate focal lengths.

In addition to the known superior features of this type of conventional zoom lens system, a lens system incorporating the principles of the present invention achieves superior anti-vibration performance and a wide field of view lens system whose focal length at the wide-angle end is shorter than the diagonal width of the image plane of the zoom lens system.

The structure of the anti-vibration group will now be described referring to the drawings. First, the first lens group $G_1$ and the fifth lens group $G_5$ tend to be large-sized lens groups, and having this sort of lens group function as the anti-vibration lens group makes the overall mechanism large and complicated, which is not good. Thus, it is clear that a lens group whose total length and diameter are small, and which does not move very much when zooming, such as the second lens group $G_2$, the third lens group $G_3$, or the fourth lens group $G_4$, is desirable.

The aperture stop, S, can be positioned near the third lens group $G_3$ so that vibration can be prevented without causing large differences in imaging performance between the center and periphery of the field of view, which is good.

Furthermore, utilizing the principles of the present invention, superior optical performance can be obtained in this type of zoom lens system by using at least one of the second lens group $G_2$, the third lens group $G_3$, or the fourth lens group $G_4$ to prevent vibration.

The anti-vibration function in a zoom lens system according to the principles of the present invention, employs a system which corrects variation in the imaging status caused by camera trembling or vibration by moving a lens group or some of the lenses thereof in a direction substantially perpendicular to the optical axis by means of anti-vibration displacement means. As a result, the anti-vibration function has an effect of image-stabilization.

It is preferred that an embodiment of the present invention satisfies the following conditions (1) and (2) when the fourth lens group $G_4$ is used for anti-vibration:

$$\Delta S/|f_4| < 0.1 \quad (1)$$

$$0.3 < |f_4|/f_T < 1.5 \quad (2)$$

where:
- $\Delta S$ is the maximum displacement in a direction substantially perpendicular to the optical axis by the fourth lens group $G_4$ when preventing vibration;
- $f_4$ is the focal length of the fourth lens group $G_4$; and
- $f_T$ is the focal length of the entire zoom lens system at the telephoto end.

Condition (1) establishes the appropriate range for the ratio of the size of $\Delta S$ and $f_4$. If the upper limit of condition (1) is exceeded, the maximum displacement ($\Delta S$) of the fourth lens group $G_4$ becomes too large, and as a result there is large aberration variation when preventing vibration, which poses a problem. Especially at peripheral positions in the image plane there would be increased discrepancies in the optical axis direction between the ideal image plane in the meridional direction and the ideal image plane in the sagittal direction. It is clear that an anti-vibration action cannot be obtained without movement, so that $\Delta S$ is larger than zero ($\Delta S > 0$). Even better results can be obtained if the upper limit of condition (1) is 0.06.

Condition (2) establishes the appropriate range for the ratio of $f_4$ and $f_T$. If the upper limit of condition (2) is exceeded, the focal length ($f_4$) of the fourth lens group $G_4$ becomes much too large, and the back focus is too small. Sufficient back focus will not be attainable, which causes problems. The amount of displacement for preventing vibration becomes much too large, which is a problem in the structure of the anti-vibration mechanism.

If the lower limit of condition (2) is exceeded, the focal length ($f_4$) of the fourth lens group $G_4$ becomes much too small, and the Petzval sum is displaced far to the negative side. Furthermore, the image plane curvature becomes excessive, which causes problems. Variations in aberrations when zooming—particularly variations in spherical aberration—become too large, which is a further problem. Even better results can be obtained if the upper limit of condition (2) is 0.8.

If the third lens group $G_3$ is used for anti-vibration purposes, the same conditions (1) and (2) are satisfied except that the focal length, $f_3$, of the third lens group $G_3$ is used in place of $f_4$, and the lower limit of condition (2) is 0.1. Also in this embodiment, better results are obtained when the upper limit of condition (1) is 0.05.

If the second lens group $G_2$ is used for anti-vibration purposes, the same conditions (1) and (2) are satisfied except that the focal length, $f_2$, of the second lens group $G_2$ is used, and the lower limit of condition (2) is 0.05. Better results are obtained when the upper limit of condition (1) is 0.05.

It is also desirable that an embodiment of the present invention satisfy the following condition (3) for the first (FIG. 1) and second (FIG. 4) embodiments:

$$1.5 < bf_W/f_W < 7.0 \qquad (3)$$

where:

$bf_W$ is the back focus at the wide-angle end; and $f_W$ is the focal length of the entire system at the wide-angle end.

Condition (3) shows the range for the ratio of $bf_W$ and $f_W$. If the upper limit of condition (3) is exceeded, the back focus becomes much too large and the lens diameter in the fourth lens group $G_4$ as well as the fifth lens group $G_5$ becomes large, which works against miniaturization. Also, there are large variations in coma aberration and image plane curvature when zooming, which are problems.

If the lower limit of condition (3) is exceeded, the back focus becomes much too small and it is difficult to ensure space for positioning filters and mirrors in the zoom lens system. It is also likely to lose its telecentricity, which is another problem. Additionally, distortion aberration at the telephoto end tends to be too large at the positive side.

If the third lens group $G_3$ or the second lens group $G_2$ is moved for anti-vibration purposes, the lower limit of condition (3) is 2.0 and the upper limit is 8.0. Even better results can be obtained if the upper limit of condition (3) is 4.0 for $G_4$ movement or 5.0 for $G_3$ movement, and the lower limit is 2.5 when either $G_4$ or $G_3$ is used for anti-vibration purposes. When the second lens group $G_2$ is used, better results are obtained if the upper limit of condition (3) is 5.0 and the lower limit is 2.5.

The apparatus of the present invention advantageously satisfies the following condition (4) for the first and second embodiments:

$$0.3 < f_5/f_W < 5 \qquad (4)$$

where:

$f_5$ is the focal length of the fifth lens group $G_5$.

Condition (4) establishes the appropriate range for the ratio of $f_5$ to $f_W$. If the upper limit of condition (4) is exceeded, the amount of displacement of the fifth lens group $G_5$ becomes much too large when zooming, which is undesirable. Image plane curvature tends to displace to the positive side, which is a further problem.

If the lower limit of condition (4) is exceeded, spherical aberration becomes excessive in the negative direction at both the wide-angle end and the telephoto end, and a large coma aberration also occurs, which are problems. It also becomes very difficult to ensure back focus. Even better results can be obtained if the upper limit of condition (4) is 3.0 and the lower limit is 2.0.

The manner is which each group handles magnification in this zoom lens system when zooming will be described. The apparatus incorporating the principles of the present invention is structured so that the imaging magnification of both the second lens group $G_2$ and the fifth lens group $G_5$ always increases when zooming from the wide-angle end to the telephoto end. This sort of structure is preferred because zooming efficiency is good and because of zoom lens structure.

To be more specific, when zooming from the wide-angle end to the telephoto end, at least one of the first lens group $G_1$ and the fifth lens group $G_5$ should move toward the object end of the zoom lens system. Therefore back focus at the telephoto end is longer than at the wide-angle end.

For the first through fourth embodiments, the third lens group $G_3$ also should move toward the object end when zooming from the wide-angle end to the telephoto end. For the fifth and sixth embodiments, the second lens group $G_2$ should so move. This type of structure shortens the total length of the zoom system in the wide-angle state and enables miniaturization.

The distance between the first lens group $G_1$ and the second lens group $G_2$ and the distance between the third lens group $G_3$ and the fourth lens group $G_4$ should be greater at the telephoto end than at the wide-angle end. Also, for the third through sixth embodiments, the fourth lens group $G_4$ should be fixed when zooming from the wide-angle end to the telephoto end or should move toward the image end of the zoom lens system.

On the other hand, the distance between the second lens group $G_2$ and the third lens group $G_3$ and the distance between the fourth lens group $G_4$ and the fifth lens group $G_5$ should be smaller at the telephoto end than at the wide-angle end. Giving the entire zoom lens system this sort of structure enables it to be nearly telecentric at the image end across the entire zoom region.

When priority is given to telecentricity in this case, the change in magnification of the fourth lens group $G_4$ must not increase when zooming from the wide-angle end to the telephoto end. On the other hand, when priority is given to high magnification, the magnification of the fourth lens group $G_4$ should increase.

In embodiments one, two, five, and six, it is preferred that the following condition (5) should be satisfied:

$$-3.0 < L_P/f_W < 3.0 \qquad (5)$$

where:

$L_P$ is the length along the optical axis at the wide-angle end from the object-side principal point H of the optical system toward the image side from an aperture stop S. (When aperture stop S is more toward the object side than the object side principal point H, $L_P$ is negative, and when the opposite is true $L_P$ is positive.)

Condition (5) establishes the appropriate range for the ratio of $L_P$ and $f_W$, which is the focal length at the wide-angle end. First, if either the upper limit or the lower limit of condition (5) is exceeded, runout becomes large due to telecentricity and shading tends to occur. If the upper limit of condition (5) is exceeded, the lens diameter on the image side from the aperture stop becomes too big. The wide-angle end's astigmatism becomes large, and distortion aberration at the wide-angle end and the telephoto end becomes large in the negative direction.

If the lower limit of condition (5) is exceeded, it becomes very difficult to ensure back focus. Spherical aberration becomes excessive in the negative direction at both the wide-angle end and the telephoto end, and a large coma aberration also occurs.

It is possible to make a mechanically simple structure by securing one of the lens groups of the available lens groups when zooming or by putting a plurality of lens groups together on the same movable track when zooming, so this is advantageous. In particular, if the fourth lens group $G_4$, which is the anti-vibration group in the first and second embodiments, is secured while zooming the anti-vibration mechanism can be simplified, which is advantageous. For the third through sixth embodiments, it is possible to secure at least one of either the second lens group $G_2$ or the fourth lens group $G_4$. These two lens groups tend to degrade performance due to eccentricity error during assembly, so securing them is very desirable for manufacturing purposes.

Next, in order to obtain an optical system with little distortion aberration or variation therein when zooming, it is necessary to have a structure in which the distribution of refractive power in all of the lens groups possesses some degree of symmetry with regard to the aperture stop, as does the basic structure of the apparatus incorporating the principles of the present invention.

To analyze the situations in which distortion aberration occurs, the entire zoom lens system should be conceptually divided into three parts. That is to say, the lens group which includes the aperture is the center group, and the lens group from the center group toward the object end is the front group, while the lens group from the center group toward the image end is the rear group.

This case requires a refractive power structure and a lens structure such that distortion aberration can be corrected to a considerable extent within both the front group and the rear group. The distortion aberration component which cannot be corrected by the front group and the rear group respectively and the distortion aberration component which cannot be cancelled out by the front group and the rear group is divided and assigned so that the center group corrects it.

By employing this sort of structure it is possible to minimize variations in distortion aberration even in moving lens groups when zooming.

On the other band, in order to greatly minimize distortion aberration, it is necessary to have a lens structure and refractive power distribution that can cancel aberration. This is accomplished by making the refractive power distribution in the front group positive ($1/f_1$) and negative ($1/f_2$) in order from the object end, and by making the refractive power distribution in the rear group negative ($1/f_4$) and positive ($1f_5$) in order from the object end. This is clarified by examining the contribution of each lens group to three-dimensional aberration.

Furthermore, it is possible to have a lens structure suitable for correcting distortion aberration even if the refractive power distribution in the front group is negative ($1/f_1$) and positive ($1/f_2$) in order from the object end and the refractive power distribution in the rear group is positive ($1/f_4$) and negative ($1f_5$) in order from the object end.

In a preferred embodiment, the apparatus incorporating the principles of the present invention satisfies the following conditions (6) and (7):

$$-1.5<(1/f_1+1/f_2)f_W<0 \quad (6)$$

$$0.5<(1/f_4+1/f_5)f_W<0.5 \quad (7)$$

where:

$f_1$ is the focal length of the first lens group $G_1$;

$f_2$ is the focal length of the second lens group $G_2$;

$f_4$ is the focal length of the fourth lens group $G_4$;

$f_5$ is the focal length of the fifth lens group $G_5$; and $f_W$ is the focal length of the entire zoom lens system at the wide-angle end.

Condition (6) stipulates the refractive power distribution at the wide-angle end of each lens group forming the front group. If the upper limit of condition (6) is exceeded, the refractive power of the front group will become too weak and it will not be suitable for wide angles. The balance of symmetry in the refractive power of the entire system will be lost, and the burden of correcting distortion aberration due to lens shape will increase.

On the other hand, if the lower limit of condition (6) is exceeded, the refractive power of the front group will become too strong in the negative direction, and the symmetry of refractive power will be lost. The burden of correcting distortion aberration will also increase, which is not desirable.

Condition (7) stipulates the refractive power distribution at the wide-angle end of each lens group forming the rear group. If the upper limit of condition (7) is exceeded, the refractive power of the rear group will weaken and the refractive power will be too great in the positive direction. As a result, the balance of symmetry in the refractive power of the entire system will be lost, and the burden of correcting distortion aberration due to lens shape will increase.

On the other hand, if the lower limit of condition (7) is exceeded, the refractive power of the rear group will become too strong in the negative direction, and the symmetry of refractive power will be lost. The burden of correcting distortion aberration will increase, which is not desirable.

When actually structuring the anti-vibration lens group of the first and second embodiments, it is desirable that the following condition (8) be satisfied:

$$0.3<\phi/|f_4|<1.2 \quad (8)$$

where:

$\phi$ is the maximum effective diameter of the surface of the anti-vibration lens group $G_4$ that is nearest the object end of the zoom lens system.

Condition (8) shows the preferred range for ensuring compactness and brightness of the anti-vibration lens group. It stipulates the appropriate range for the ratio of $\phi$ to $f_4$.

If the upper limit of condition (8) is exceeded, the optical system will be unnecessarily bright and the size of the optical system will increase. The number of lenses also increases excessively. The refractive power of the fourth lens group $G_4$ becomes too strong and it is difficult to correct aberrations, including spherical aberration, which is not preferred.

On the other hand, if the lower limit of condition (8) is exceeded, the refractive power of the fourth lens group $G_4$ becomes too weak, and the amount of displacement of the lens group when zooming is large. As a result, there is interference with adjacent lens groups and it becomes difficult to ensure an adequate zoom ratio. The optical system is dark and the number of times that additional illumination when photographing a dark subject is required increases. However, this limit does not apply when using illumination.

Furthermore, it is desired that the first and second embodiment of the present invention should satisfy the following condition (9), while all of the embodiments should satisfy the following condition (10):

$$2.0<L_W/bf<10.0 \quad (9)$$

$$2.0<d/f_W<10.0 \quad (10)$$

where:

$L_W$ is total lens length at the wide-angle end; and d is the effective diameter of the first lens group $G_1$'s lens surface nearest the object end.

Condition (9) stipulates the appropriate ratio of $L_W$ to bf, which is the wide-angle end's back focus. If the upper limit of condition (9) is exceeded, total lens length $L_W$ increases, which is not good for obtaining a compact zoom lens system. It also leads to an increase in the front spherical diameter. Additionally, it becomes difficult to correct coma aberration of the lower light beam in the principal ray, which is disadvantageous.

On the other hand, if the lower limit of condition (9) is exceeded, the total lens length $L_W$ at the wide-angle end becomes much too small, and it is very difficult to ensure space to house the anti-vibration mechanism and the mechanism for zooming. The refractive power of each lens group (particularly the first lens group $G_1$ and the fifth lens group $G_5$) becomes much too strong, and correction of aberrations such as spherical aberration and coma aberration and so forth is very difficult.

Condition (10) stipulates the appropriate range for the ratio of d to $f_W$, which is the focal length of the entire lens system at the wide-angle end. If the upper limit of condition (10) is exceeded, the optical system will be unnecessarily bright and the size of the optical system will increase. It will be difficult to correct aberrations, including spherical aberration, occurring in the first lens group $G_1$, so this is not preferred.

On the other hand, if the lower limit of condition (10) is exceeded, sufficient brightness in the optical system cannot be ensured, which is a problem. The diameter of the optical system to the rear of the stop becomes large, which is also a problem. Also, the optical system's exit pupil tends to be undesirably displaced to the rear of the image plane.

For best results of condition (9), the upper limit should be 8.0 and the lower limit should be 5.0.

If y is the maximum image height, the apparatus incorporating the principles of the present invention should satisfy the following condition (11):

$$10.0 < L_W/y < 25.0 \tag{11}$$

Condition (11) shows the appropriate range of conditions for the ratio of total length, $L_w$, of the system at the wide-angle end to the maximum image height, y.

If the upper limit of condition (11) is exceeded, the total length becomes much too long, and the weight of the entire lens increases greatly. Particularly the lens diameter of the first group $G_1$ and the fifth group $G_5$ becomes big, which works against miniaturization. When housed in a fixed filter diameter the amount of peripheral light tends to become inadequate, which is a problem.

If the lower limit of condition (11) is exceeded, the total length of the wide-angle end becomes much too short, and there is not enough freedom to correct aberration, and problems arise. Generally speaking, to satisfactorily correct various aberrations a number of lens surfaces should be placed before and after the stop and as distant as possible. But in this case the surface of each lens is too close to the stop, so satisfactory correction is very difficult. As a result, various aberrations—particularly coma aberration—cannot be sufficiently corrected. Thus it is very difficult to obtain good imaging performance. Also the Petzval sum has a tendency to be displaced too far to the negative side.

Furthermore, in the various embodiments of the present invention the prevention of vibration is described by a method which moves the second lens group $G_2$, the third lens group $G_3$, or the fourth lens group $G_4$ in a direction substantially perpendicular to the optical axis. But the second lens group $G_2$, the third lens group $G_3$, or the fourth lens group $G_4$ may also be rotationally moved around the optical axis or a predetermined point near the optical axis. That is, when preventing vibration even better anti-vibration performance can be obtained by adding and driving a tilt component as well as a shift component. It is also possible to eccentrically drive part of the lens group in the second lens group $G_2$, the third lens group $G_3$, or the fourth lens group $G_4$ and prevent vibration.

In accordance with the principles of the present invention in the first and second embodiments, the first lens group $G_1$ should preferably have at least one cemented lens for satisfactory color correction. An aspheric surface should preferably be provided in the concave lenses in the second lens group $G_2$. Doing so is advantageous for wide angles, and the surface closest to the object end in particular should preferably have an aspheric surface. When doing so, the shape of the aspheric surface should be shaped so that refractive power decreases as the distance from the optical axis increases.

In the first and second embodiments, the third lens group $G_3$ should preferably have at least one cemented lens. The aperture stop should be in or near the third lens group $G_3$.

When focusing, it is possible to reduce aberration variation by moving all or part of the third lens group $G_3$ in the direction of the optical axis. Accordingly, this is preferred.

Furthermore, if a fixed stop is positioned near the anti-vibration lens group, unnecessary stray light can be cut off when preventing vibration.

In the first and second embodiments, the following type of structure is preferred in order for the anti-vibration lens group $G_4$ to achieve good optical performance, including vibration prevention. The anti-vibration lens group $G_4$ should have at least one cemented lens, and to make it sufficiently achromatic, the difference in Abbe values ($\Delta v$) at the cemented surface should satisfy the following condition (12):

$$10.0 < \Delta v \tag{12}$$

Furthermore, if there is more than one cemented surface, the cemented surface nearest the object end should satisfy the above condition (12).

In the first and second embodiments, to ensure the flatness of the image plane when preventing vibration, the Petzval sum, P, of the anti-vibration group $G_4$ should fall in the range of the following condition (13):

$$0.07 < |P| < 0.25 \tag{13}$$

when the focal length at the wide-angle end is 1.

When a cemented lens is included in the fourth lens group $G_4$, the cemented surface should be convex at the object end. To suppress variation in various aberrations when preventing vibration, the refractive index of the concave lens nearest the image end should be 1.65 or greater. Additionally, the fourth lens group $G_4$ should be structured from the object end as a double concave single lens cemented to a convex lens with the cemented surface toward the object end.

For the first and second embodiments, the fifth lens group $G_5$ should also preferably have at least one cemented lens to make it sufficiently achromatic. Additionally, it should have one aspheric surface. This makes it possible to satisfactorily correct coma aberration or distortion aberration.

Furthermore, even better optical performance can be obtained for all of the embodiments by additionally adding an aspheric lens or a lens which uses glass with a distributed index of refraction to the zoom lens system incorporating the principles of the present invention. Chromatic aberration can be reduced by using special low dispersion glass in the first lens group $G_1$ or the fifth lens group $G_5$. Accordingly, this is preferred.

If $\phi_L$ is the effective diameter of the lens surface nearest the image end, the following condition (14) should apply:

$$0.2 < \phi_L/f_W < 1 \tag{14}$$

If the lower limit of condition (14) is exceeded, it is difficult to ensure sufficient back focus and telecentricity, while if the upper limit is exceeded the lens diameter becomes too large and there is too much peripheral light, which is a problem.

In the third through sixth embodiments, it is preferred that the following conditions (15) and (16) be satisfied:

$$4.5 < L_W/y < 20.0 \tag{15}$$

$$0.3 < |f_4/f_W| < 9.0 \tag{16}$$

where:

$L_W$ is the total length at the wide-angle end from the first lens surface to the final lens surface (ens total length);

y is the maximum image height;

$f_4$ is the focal length of the fourth lens group $G_4$; and $f_W$ is the focal length of the total system at the wide-angle end.

Condition (15) establishes the appropriate condition range for the ratio of $L_w$, which is the total lens length at the wide-angle end, and y, which is the maximum image height. If the upper limit of condition (15) is exceeded, the total length becomes much too large, and the weight of the entire lens increases, which is a problem. Particularly the lens diameter of the first group $G_1$ and the fifth group $G_5$ becomes big, which works against miniaturization. When housed in a fixed filter diameter the amount of peripheral light tends to become inadequate.

If the lower limit of condition (15) is exceeded, total length $L_W$ at the wide-angle end becomes much too small, and there is not enough freedom to correct aberration, and problems arise. Generally speaking, to satisfactorily correct various aberrations one should put a number of lens surfaces before and after the stop and as distant as possible, but in this case the surface of each lens is too close to the stop, so satisfactory correction is very difficult. As a result, various aberrations—particularly coma aberration—cannot be sufficiently corrected, so it is very difficult to obtain good imaging performance. Also, the Petzval sum has a tendency to displace too far to the negative side, which is a problem.

Condition (16) determines the appropriate range for the ratio of the size of $f_4$, which is the focal length of the fourth lens group $G_4$, and $f_W$, which is the focal length of the entire system at the wide-angle end. If the upper limit of condition (16) is exceeded, the size of the fourth lens group $G_4$'s focal length $f_4$ becomes too large, and as a result back focus is too small and sufficient back focus cannot be obtained, which leads to problems. Also, it tends to be difficult to ensure telecentricity.

If the lower limit of condition (16) is exceeded, the size of the fourth lens group $G_4$ 's focal length $f_4$ becomes too small, the Petzval sum is greatly displaced to the negative side, and image curvature is too great and problems occur. Also, variation in various aberrations when zooming—particularly variations in spherical aberration—become too large, which is a problem.

Furthermore, to fully realize the effect of the apparatus incorporating the principles of the present invention, the upper limit of condition (16) should be 4.0 and the lower limit should be 2.0.

Also, for the third through sixth embodiments, the following conditions (17) and (18) should be satisfied:

$$0.1 < f_1/(F_{nT} \cdot f_T) < 3.0 \tag{17}$$

$$0.015 < |f_2/(F_{nT} \cdot f_T)| < 3.0 \tag{18}$$

where:

$F_{nT}$ is the open F-number of the entire zoom lens system at the telephoto end.

Condition (17) stipulates the appropriate range of $f_1$, the focal length of the first lens group $G_1$, relative to $f_T$, the focal length of the entire system at the telephoto end, and brightness (F-number) $F_{nT}$. If the lower limit of condition (17) is exceeded, the optical system becomes dark and deviates from the intent of the present invention, which is not suitable. Also, the focal length $f_1$ of the first lens group $G_1$ is smaller than necessary, so negative spherical aberration tends to occur, which is a problem. Furthermore, the Petzval sum goes too far to the positive side.

If the upper limit of condition (17) is exceeded, the optical system becomes too bright, so correction of various aberrations is very difficult. Also, the focal length $f_1$ of the first lens group $G_1$ is larger than necessary, so the entire length becomes excessive. Furthermore, the aperture diameter is also large, which is a problem. Also, positive spherical aberration tends to occur.

To fully realize the effect of the third through sixth embodiments of the present invention, the upper limit of condition (17) should be 1.0 and the lower limit should be 0.2.

Condition (18) stipulates the appropriate range of $f_2$, the focal length of the second lens group $G_2$, relative to $f_T$, the focal length of the entire system at the telephoto end, and brightness (F-number) $F_{nT}$. If the lower limit of condition (18) is exceeded, the optical system becomes dark and deviates from the intent of the present invention. Also, the focal length $f_2$ of the second lens group $G_2$ is smaller than necessary, so positive spherical aberration tends to occur. The Petzval sum goes too far to the negative side, which is also a problem.

If the upper limit of condition (18) is exceeded, the optical system becomes too bright, so correction of various aberrations is very difficult. The focal length $f_2$ of the second lens group $G_2$ is too large, so the axial air distance for zooming becomes too large, and as a result the entire length becomes too long. Moreover, variations in coma aberration tend to occur when zooming, which is a problem.

Now, when actually structuring the anti-vibration lens group of the third and fourth embodiments, satisfying the following condition (19) is preferred:

$$0.2 < \phi/f_3 < 1.2 \tag{19}$$

where:

$\phi$ is the maximum effective diameter of the lens surface of anti-vibration lens group $G_3$ that is nearest the object end.

Condition (19) shows the preferred range for ensuring compactness and brightness of the anti-vibration lens group $G_3$. If the upper limit of condition (19) is exceeded, the optical system will be unnecessarily bright and the size of the optical system will increase. Also, the number of lenses will increase excessively, which is not preferred. The refractive power of the third lens group $G_3$ becomes too strong and it is difficult to correct aberrations, including spherical aberration.

On the other hand, if the lower limit of condition (19) is exceeded, the refractive power of the third lens group $G_3$ becomes too weak, and the amount of displacement of the lens group when zooming is large. As a result, there is interference with adjacent lens groups and it becomes difficult to ensure an adequate zoom ratio. Also, the optical system is dark and the frequency of requiring illumination when photographing a dark subject increases. However, this limit does not apply when using illumination.

The third lens group $G_3$, which is the anti-vibration lens group in the third and fourth embodiments, should have at least one cemented lens. To make it sufficiently achromatic, the difference in Abbe values ($\Delta v$) at the cemented surface should satisfy the following condition (20):

$$7.0 < \Delta v \tag{20}$$

Furthermore, if there is more than one cemented surface, the cemented surface nearest the object end should satisfy the condition (20). The aperture stop should be in the third lens group $G_3$ or near the third lens group $G_3$.

Furthermore, if a fixed stop is positioned near the anti-vibration lens group $G_3$, unnecessary stray light can be cut off when preventing vibration, so this is preferred.

In the third and fourth embodiments, when focusing, it is possible to reduce aberration variation by moving the second lens group $G_2$ in the direction of the optical axis, or by moving the entire anti-vibration third lens group $G_3$ or moving part of this lens group in the direction of the optical axis, so this is preferred.

To ensure the flatness of the image plane when preventing vibration, the Petzval sum P of the anti-vibration group $G_3$ in the third and fourth embodiments should satisfy the following condition (21):

$$0.1<P<1.3 \tag{21}$$

when the focal length at the wide-angle end is 1.

Additionally, the anti-vibration group $G_3$ should have at least two lens groups with a positive refractive power from the object end. One of these should be a cemented lens with a positive lens component and a concave lens component. To suppress variation in various aberrations when zooming, the cemented surface should be convex on the image end.

The fourth lens group $G_4$ should have a negative lens component on the object end and additionally should have at least one cemented lens.

It is preferred that the fifth and sixth embodiments should satisfy the following condition (22):

$$0.3<\phi/|f_2|<5.0 \tag{22}$$

where:

$\phi$ is the maximum effective diameter of the lens surface of the anti-vibration lens group $G_2$ that is nearest the object end.

Condition (22) shows the preferred range for ensuring compactness and brightness of the anti-vibration lens group $G_2$. If the upper limit of condition (22) is exceeded, the optical system will be unnecessarily bright and the size of the optical system will increase. The number of lenses will also increase excessively. The refractive power of the second lens group $G_2$ becomes too strong and it is difficult to correct aberrations, including spherical aberration.

On the other hand, if the lower limit of condition (22) is exceeded, the refractive power of the second lens group $G_2$ becomes too weak, and the amount of displacement of the lens group when zooming is large. As a result, there is interference with adjacent lens groups and it becomes difficult to ensure an adequate zoom ratio. The optical system is dark and the frequency of requiring illumination when photographing a dark subject increases. However, this limit does not apply when using illumination.

In the fifth and sixth embodiments of the present invention, vibration is prevented by a method which moves the second lens group $G_2$ in a direction substantially perpendicular to the optical axis. As noted above, the second lens group $G_2$ may also be rotationally moved around the optical axis or a predetermined point near the optical axis. As also noted, when preventing vibration even better anti-vibration performance can be obtained by adding and driving a tilt component as well as a shift component. Also, it is also possible to eccentrically drive part of the lens group in the second lens group $G_2$ and prevent vibration.

To additionally describe the structure of each lens group in the present invention, the first lens group $G_1$ should have at least one cemented lens for satisfactory color correction.

Providing an aspheric surface in the second lens group $G_2$ is also desirable in terms of anti-vibration performance. Providing an aspheric surface in the second lens group $G_2$ makes it easy to secure the second lens group $G_2$ in the optical axis direction when zooming.

The second lens group $G_2$, which is the anti-vibration lens group in the fifth and sixth embodiments, should have at least one cemented lens. To make it sufficiently achromatic, the difference in Abbe values ($\Delta v$) at the cemented surface should satisfy the following condition (23):

$$8.0<\Delta v \tag{23}$$

Furthermore, if there is more than one cemented surface, the cemented surface nearest the object end should satisfy condition (23). The aperture stop should be in the third lens group $G_3$ or near the third lens group $G_3$.

When focusing, it is possible to reduce aberration variation by moving the entire anti-vibration second lens group $G_2$ or part of the lens group in the direction of the optical axis, or by moving the entire third lens group $G_3$ or part of the lens group in the direction of the optical axis, so this is preferred.

To ensure the flatness of the image plane when preventing vibration, the Petzval sum P of the anti-vibration group $G_2$ of the fifth and sixth embodiments should fall in the range of the following condition (24):

$$-1.7<P<1.3 \tag{24}$$

when the focal length at the wide-angle end is 1.

Additionally, the anti-vibration group $G_2$ should have at least two lens groups with a negative refractive power from the object end. A cemented lens with a positive lens component and a negative lens component should be positioned at the object end. To suppress various aberration variations when zooming, the refractive index of the negative lens with the highest refractive index in the second lens group $G_2$ should be 1.76 or higher, and the refractive index of the negative lens closest to the object end in the second lens group $G_2$ should be 1.60 or higher.

Furthermore, if a fixed stop is positioned near the anti-vibration lens group $G_2$, unnecessary stray light can be cut off when preventing vibration, so this is preferred.

The fourth lens group $G_4$ for the fifth and sixth embodiments should have a negative lens component on the object end and additionally should have at least one cemented lens.

For the fifth and sixth embodiments, to make the fifth lens group $G_5$ sufficiently achromatic, it should also have at least one cemented lens. At least one surface should have an aspheric surface. As previously noted, this makes it possible to satisfactorily correct coma aberration or distortion aberration. The following Table 1 and Table 2 show basic data relating to the first embodiment and the second embodiment respectively. Table 4 and Table 5 show basic data for the third embodiment and the fourth embodiment respectively, while Table 7 and 8 show basic data for the fifth embodiment and the sixth embodiment respectively.

Under "Lens Basic Data" in each table, No. in the first column is the number of each lens surface from the object end, r is the radius of curvature for each lens surface, d is the separation of each lens surface, $v_d$ is the reference Abbe value for each lens at the d-line ($\lambda$=587.6 nm), and $n_d$ and $n_g$ are the refractive index respectively of each lens at the d-line and g-line ($\lambda$=435.8 nm). Lens surfaces whose lens surface number is marked with an asterisk (*) are aspheric surfaces. For aspheric lens surfaces, the radius of curvature r is the radius of curvature at the vertex, and the shape of the aspheric surface is the shape expressed by the following equation (a):

TABLE 1

$$x = \frac{y^2/r}{1+\sqrt{1-\kappa \cdot y^2/r^2}} + \sum C_n \cdot y^2$$

Embodiment 1
Various Lens Values

| No. | r | d | $v_d$ | $n_d$ | $n_g$ |
| --- | --- | --- | --- | --- | --- |
| 1. | 56.75393 | 1.50000 | 23.01 | 1.860741 | 1.910649 |
| 2. | 30.53078 | 12.00000 | 65.42 | 1.603001 | 1.614372 |
| 3. | 581.66352 | 0.05000 | | | |
| 4. | 27.22534 | 7.00000 | 53.93 | 1.713000 | 1.729417 |
| 5. | 79.36112 | ($d_5$) | | | |
| *6. | 35.37461 | 1.00000 | 39.82 | 1.869940 | 1.897730 |
| 7. | 8.11630 | 4.30000 | | | |

TABLE 1-continued $$x = \frac{y^2/r}{1+\sqrt{1-\kappa \cdot y^2/r^2}} + \sum C_n \cdot y^2$$

| | | | | | |
|---|---|---|---|---|---|
| 8. | −15.97524 | 1.00000 | 45.37 | 1.796681 | 1.818801 |
| 9. | 15.00261 | 0.05000 | | | |
| 10. | 12.99487 | 3.70000 | 27.63 | 1.740771 | 1.776142 |
| 11. | −14.39344 | 0.50000 | | | |
| 12. | −12.68872 | 1.00000 | 45.37 | 1.796681 | 1.818801 |
| 13. | 12.49296 | 2.00000 | 30.04 | 1.698950 | 1.729431 |
| 14. | −102.52249 | ($d_{14}$) | | | |
| 15. | (Aperture stop) | 0.70000 | | | |
| 16. | 28.36132 | 4.20000 | 53.48 | 1.547390 | 1.560219 |
| 17. | −8.54370 | 1.00000 | 45.37 | 1.796681 | 1.818801 |
| 18. | −21.02498 | 0.05000 | | | |
| 19. | −42.20692 | 2.50000 | 64.10 | 1.516800 | 1.526703 |
| 20. | −15.73708 | ($d_{20}$) | | | |
| 21. | −27.07482 | 0.60000 | 52.30 | 1.748099 | 1.765893 |
| 22. | 45.22850 | 1.80000 | | | |
| 23. | 23.06894 | 1.00000 | 49.45 | 1.772789 | 1.792324 |
| 24. | 14.00007 | 4.00000 | 35.51 | 1.595071 | 1.616844 |
| 25. | 57.44887 | ($d_{25}$) | | | |
| 26. | 25.10379 | 4.50000 | 82.52 | 1.497820 | 1.505265 |
| 27. | −53.71007 | 0.50000 | | | |
| 28. | −106.88770 | 0.80000 | 27.63 | 1.740771 | 1.776142 |
| 29. | 19.87858 | 5.40000 | 67.87 | 1.593189 | 1.604034 |
| 30. | −52.96740 | 0.10000 | | | |
| 31. | 20.64530 | 4.20000 | 60.23 | 1.518350 | 1.528997 |
| *32. | −289.88002 | (bf) | | | |

Aspherical Surface Data

No. 6

$\kappa = 1.000$  $C_4 = -7.40550 \times 10^{-6}$  $C_6 = -3.84200 \times 10^{-7}$
$C_8 = -4.25680 \times 10^{-9}$  $C_{10} = 9.61370 \times 10^{-12}$ No. 32

$\kappa = 1.000$  $C_4 = 3.47800 \times 10^{-5}$  $C_6 = 1.31740 \times 10^{-8}$
$C_8 = -9.25880 \times 10^{-11}$  $C_{10} = 4.80680 \times 10^{-13}$ Variable Lens Separation Values

| | Wide-Angle End | Telephoto End |
|---|---|---|
| $d_5$ | 0.46148 | 19.55296 |
| $d_{14}$ | 10.49817 | 1.18183 |
| $d_{20}$ | 0.04866 | 21.06623 |
| $d_{25}$ | 9.40014 | 0.80897 |
| bf | 24.94325 | 33.53441 |

Anti-Vibration Data

| | | |
|---|---|---|
| The amount of movement for the fourth lens group | $G_4$: $\Delta S = 0.4$ | |
| The amount of movement of the image | Wide-Angle End | −0.29011 |
| | Telephoto End | −0.39982 |

TABLE 2

Embodiment 2
Various Lens Values

| No. | r | d | $\nu_d$ | $n_d$ | $n_g$ |
|---|---|---|---|---|---|
| 1. | 74.81416 | 1.00000 | 25.50 | 1.804581 | 1.846310 |
| 2. | 29.45523 | 10.00000 | 67.87 | 1.593189 | 1.604034 |
| 3. | −534.67118 | 0.05000 | | | |
| 4. | 25.94147 | 6.50000 | 49.45 | 1.772789 | 1.792324 |
| 5. | 65.63110 | ($d_5$) | | | |
| *6. | 38.20395 | 1.20000 | 43.35 | 1.840421 | 1.864916 |
| 7. | 7.35622 | 4.00000 | | | |
| 8. | −18.66041 | 0.60000 | 45.37 | 1.796681 | 1.818801 |
| 9. | 31.59350 | 0.05000 | | | |
| 10. | 18.60124 | 2.30000 | 27.63 | 1.740771 | 1.776142 |
| 11. | −15.07465 | 0.50000 | | | |

TABLE 2-continued

| | | | | | |
|---|---|---|---|---|---|
| 12. | −12.53932 | 0.60000 | 45.37 | 1.796681 | 1.818801 |
| 13. | 39.55098 | 1.25000 | 23.01 | 1.860741 | 1.910649 |
| 14. | 464.28780 | ($d_{14}$) | | | |
| 15. | 894.53251 | 3.00000 | 58.54 | 1.612720 | 1.625709 |
| 16. | −11.17685 | 1.00000 | 49.45 | 1.772789 | 1.792324 |
| 17. | −26.51491 | 0.05398 | | | |
| 18. | 40.48327 | 2.00000 | 49.45 | 1.772789 | 1.792324 |
| 19. | −33.17195 | 0.30000 | | | |
| 20. | (Aperture stop) | ($d_{20}$) | | | |
| 21. | −21.75011 | 1.00000 | 53.93 | 1.713000 | 1.729417 |
| 22. | 26.87886 | 1.00000 | | | |
| 23. | 18.63513 | 0.80000 | 53.93 | 1.713000 | 1.729417 |
| 24. | 10.77543 | 3.50000 | 35.51 | 1.595071 | 1.616844 |
| 25. | 68.35273 | ($d_{25}$) | | | |
| 26. | 31.23825 | 2.94718 | 53.93 | 1.713000 | 1.729417 |
| 27. | −58.85261 | 0.10000 | | | |
| 28. | 238.58965 | 0.80000 | 25.50 | 1.804581 | 1.846310 |
| 29. | 13.05077 | 4.07683 | 67.87 | 1.593189 | 1.604034 |
| 30. | 267.55933 | 0.10000 | | | |
| 31. | 21.51999 | 3.85159 | 65.42 | 1.603001 | 1.614372 |
| *32. | −47.22155 | (bf) | | | |

Aspherical Surface Data

No. 6

$\kappa = 1.0000$  $C_4 = 1.87560 \times 10^{-5}$  $C_6 = 1.28700 \times 10^{-7}$
$C_8 = -3.20110 \times 10^{-9}$  $C_{10} = 1.41630 \times 10^{-11}$ No. 32

$\kappa = 2.0000$  $C_4 = 4.02540 \times 10^{-5}$  $C_6 = -1.74630 \times 10^{-7}$
$C_8 = 1.77290 \times 10^{-9}$  $C_{10} -1.01870 \times 10^{-11}$ Variable Lens Separation Values

| | Wide-Angle End | Telephoto End |
|---|---|---|
| $d_5$ | 0.70000 | 19.99851 |
| $d_{14}$ | 10.00001 | 1.00001 |
| $d_{20}$ | 0.70000 | 13.79176 |
| $d_{25}$ | 9.27228 | 1.50000 |
| bf | 20.99986 | 25.85952 |

Anti-Vibration Data

| | | |
|---|---|---|
| The amount of movement for the fourth lens group | $G_4$: $\Delta S = 0.7$ | |
| The amount of movement of the image | Wide-Angle End: −0.52889 | |
| | Telephoto End: −0.68206 | |

The following Table 3 gives various values for each of the first and second embodiments related to the above-noted conditions (1) through (11), and gives values for each of the conditions (1) through (11).

TABLE 3

| Embodiment Number | 1 | 2 |
|---|---|---|
| $\Delta S$ | 0.4 | 0.7 |
| bf | 24.943 | 21.000 |
| $f_W$ | 7.800 | 7.800 |
| $f_T$ | 52.500 | 52.500 |
| $f_1$ | 43.325 | 42.294 |
| $f_2$ | −6.123 | −6.570 |
| $f_3$ | 21.530 | 17.416 |
| $f_4$ | −29.749 | −24.700 |
| $f_5$ | 20.857 | 18.165 |
| $L_P$ | 2.664 | −0.34524 |
| $\phi$ | 13.32 | 10.05 |
| $L_W$ | 110.802 | 94.252 |
| d | 50.8 | 42.4 |
| $\Delta \nu$ | 13.94 | 18.42 |
| P | −0.13537 | −0.16965 |
| $\phi_L$ | 19.4 | 15.78 |
| Y | 5.5 | 5.5 |

TABLE 3-continued

| | Embodiment Number | 1 | 2 |
|---|---|---|---|
| (1) | $\Delta S / |f_4|$ | 0.01345 | 0.0283 |
| (2) | $|f_4| / f_T$ | 0.5667 | 0.470 |
| (3) | $b_f / f_W$ | 3.1978 | 2.692 |
| (4) | $f_5 / f_W$ | 2.6740 | 2.3288 |
| (5) | $L_P / f_W$ | 0.3415 | −0.04426 |
| (6) | $(1 / f_1 + 1 / f_2) f_W$ | −1.094 | −1.003 |
| (7) | $(1 / f_4 + 1 / f_5) f_W$ | 0.1118 | 0.1136 |
| (8) | $\phi / |f_4|$ | 0.4477 | 0.4069 |
| (9) | $L_W / bf$ | 4.442 | 4.488 |
| (10) | $d / f_W$ | 6.513 | 5.436 |
| (11) | $L_W / y$ | 20.15 | 17.14 |

TABLE 4

Embodiment 3
Various Lens Values

| No. | r | d | $\nu_d$ | $n_d$ | $n_g$ |
|---|---|---|---|---|---|
| 1. | 56.7539 | 1.5000 | 23.01 | 1.860741 | 1.910649 |
| 2. | 30.5308 | 12.0000 | 65.42 | 1.603001 | 1.614372 |
| 3. | 581.6635 | 0.0500 | | | |
| 4. | 27.2253 | 7.0000 | 53.93 | 1.713000 | 1.729417 |
| 5. | 79.3611 | ($d_5$) | | | |
| *6. | 35.3746 | 1.0000 | 39.82 | 1.869940 | 1.897730 |
| 7. | 8.1163 | 4.3000 | | | |
| 8. | −15.9752 | 1.0000 | 45.37 | 1.796681 | 1.818801 |
| 9. | 15.0026 | 0.0500 | | | |
| 10. | 12.9949 | 3.7000 | 27.63 | 1.740771 | 1.776142 |
| 11. | −14.3934 | 0.5000 | | | |
| 12. | −12.6887 | 1.0000 | 45.37 | 1.796681 | 1.818801 |
| 13. | 12.4930 | 2.0000 | 30.04 | 1.698950 | 1.729431 |
| 14. | −102.5225 | ($d_{14}$) | | | |
| 15. | (Aperture Stop) | 0.7000 | | | |
| 16. | 28.4684 | 4.2000 | 53.48 | 1.547390 | 1.560219 |
| 17. | −8.2441 | 1.0000 | 45.37 | 1.796681 | 1.818801 |
| 18. | −22.7488 | 0.0500 | | | |
| 19. | −43.4016 | 1.9078 | 64.10 | 1.516800 | 1.526703 |
| 20. | −14.2961 | ($d_{20}$) | | | |
| 21. | −27.2035 | 0.6000 | 52.30 | 1.748099 | 1.765893 |
| 22. | 42.4016 | 1.6947 | | | |
| 23. | 23.2746 | 1.0000 | 49.45 | 1.772789 | 1.792324 |
| 24. | 14.1565 | 2.7262 | 35.51 | 1.595074 | 1.616844 |
| 25. | 63.0603 | ($d_{25}$) | | | |
| 26. | 25.0221 | 4.5000 | 82.52 | 1.497820 | 1.505265 |
| 27. | −56.9536 | 0.5000 | | | |
| 28. | −122.0583 | 0.8000 | 27.63 | 1.40771 | 1.776142 |
| 29. | 19.7603 | 5.4000 | 67.87 | 1.593189 | 1.604029 |
| 30. | −52.3437 | 0.1000 | | | |
| 31. | 20.8855 | 4.2000 | 60.23 | 1.518350 | 1.528997 |
| *32. | −325.2426 | (bf) | | | |

Aspherical Surface Data

No. 6

$\kappa = 1.0000 \quad C_4 = -7.40550 \times 10^{-6} \quad C_6 = 3.84200 \times 10^{-7}$
$C_8 = -4.25680 \times 10^{-9} \quad C_{10} = 9.61370 \times 10^{-12}$ No. 32

$\kappa = 1.0000 \quad C_4 = 3.45640 \times 10^{-5} \quad C_6 = 1.43540 \times 10^{-8}$
$C_8 = -9.33630 \times 10^{-11} \quad C_{10} = 5.75660 \times 10^{-13}$ Variable Lens Separation Values

| | Wide-Angle End | Telephoto End |
|---|---|---|
| $d_5$ | 0.46148 | 19.55296 |
| $d_{14}$ | 10.67311 | 1.35677 |
| $d_{20}$ | 0.59924 | 21.61681 |
| $d_{25}$ | 9.96205 | 1.37088 |
| bf | 24.90802 | 33.49918 |

TABLE 4-continued

Anti-Vibration Data

| | |
|---|---|
| The amount of movement for the third lens group | $G_3: \Delta S = 0.3$ |
| The amount of movement of the image | Wide-Angle End: +0.309 |
| | Telephoto End: +0.454 |

TABLE 5

Embodiment 4
Various Lens Values

| No. | r | d | $\nu_d$ | $n_d$ | $n_g$ |
|---|---|---|---|---|---|
| 1. | 74.8142 | 1.0000 | 25.50 | 1.804581 | 1.846310 |
| 2. | 29.4552 | 10.0000 | 67.87 | 1.593189 | 1.604034 |
| 3. | −534.6712 | 0.0500 | | | |
| 4. | 25.9415 | 6.5000 | 49.45 | 1.772789 | 1.792324 |
| 5. | 65.6311 | ($d_5$) | | | |
| *6. | 38.2040 | 1.2000 | 43.35 | 1.840421 | 1.864916 |
| 7. | 7.3562 | 4.0000 | | | |
| 8. | −18.6604 | 0.6000 | 45.37 | 1.796681 | 1.818801 |
| 9. | 31.5935 | 0.0500 | | | |
| 10. | 18.6012 | 2.3000 | 27.63 | 1.740771 | 1.776142 |
| 11. | −15.0747 | 0.5000 | | | |
| 12. | −12.5393 | 0.6000 | 45.37 | 1.796681 | 1.818801 |
| 13. | 39.5510 | 1.2500 | 23.01 | 1.860741 | 1.910649 |
| 14. | 464.2878 | ($d_{14}$) | | | |
| 15. | 894.5325 | 3.0000 | 58.54 | 1.612720 | 1.625709 |
| 16. | −11.1768 | 1.0000 | 49.45 | 1.772789 | 1.792324 |
| 17. | −26.5149 | 0.0540 | | | |
| 18. | 40.4833 | 2.0000 | 49.45 | 1.772789 | 1.792324 |
| 19. | −33.1720 | ($d_{19}$) | | | |
| 20. | −21.7501 | 1.0000 | 53.93 | 1.713000 | 1.729417 |
| 21. | 26.8789 | 1.0000 | | | |
| 22. | 18.6351 | 0.8000 | 53.93 | 1.713000 | 1.729417 |
| 23. | 10.7754 | 3.5000 | 35.51 | 1.595071 | 1.616844 |
| 24. | 68.3527 | ($d_{24}$) | | | |
| 25. | 31.2383 | 2.9472 | 53.93 | 1.713000 | 1.729417 |
| 26. | −58.8526 | 0.1000 | | | |
| 27. | 238.5897 | 0.8000 | 25.50 | 1.804581 | 1.846310 |
| 28. | 13.0508 | 4.0768 | 67.87 | 1.593189 | 1.604034 |
| 29. | 267.5593 | 0.1000 | | | |
| 30. | 21.5200 | 3.8516 | 65.42 | 1.603001 | 1.614372 |
| *31. | −47.2216 | (bf) | | | |

Aspherical Surface Data

No. 6

$\kappa = 1.0000 \quad C_4 = 1.81560 \times 10^{-5} \quad C_6 = 1.28700 \times 10^{-7}$
$C_8 = -3.20110 \times 10^{-9} \quad C_{10} = 1.41630 \times 10^{-11}$ No. 32

$\kappa = 2.0000 \quad C_4 = 4.02540 \times 10^{-5} \quad C_6 = -1.74630 \times 10^{-7}$
$C_8 = 1.77290 \times 10^{-9} \quad C_{10} = -1.01870 \times 10^{-11}$ Variable Lens Separation Values

| | Wide-Angle End | Telephoto End |
|---|---|---|
| $d_5$ | 0.70000 | 19.99851 |
| $d_{14}$ | 10.00001 | 1.00001 |
| $d_{19}$ | 1.00000 | 14.09176 |
| $d_{24}$ | 9.27228 | 1.50000 |
| bf | 20.99985 | 25.85951 |

Anti-Vibration Data

| | |
|---|---|
| The amount of movement for the third lens group | $G_3: \Delta S = 0.4$ |
| The amount of movement of the image | Wide-Angle End: = +0.445 |
| | Telephoto End: = +0.664 |

The following Table 6 gives various values for each of the third and fourth embodiments related to the aforesaid conditions (1) through (3), (5), (10), and (15) through (19), and gives values for each of the conditions (1) through (3), (5), (10), and (15) through (19).

TABLE 6

| Embodiment Number | | 3 | 4 |
|---|---|---|---|
| ΔS | | 0.3 | 0.4 |
| bf | | 24.908 | 21.000 |
| $f_W$ | | 7.800 | 7.800 |
| $f_T$ | | 52.500 | 52.500 |
| $L_W$ | | 85.175 | 73.252 |
| y | | 5.5 | 5.5 |
| $f_1$ | | 43.325 | 42.294 |
| $f_2$ | | −6.123 | −6.570 |
| $f_3$ | | 21.530 | 17.416 |
| $f_4$ | | −29.749 | −24.700 |
| $f_5$ | | 20.857 | 18.165 |
| $L_P$ | | 4.840 | −0.04524 |
| $F_{nT}$ | | 2.91 | 3.63 |
| φ | | 9.85 | 8.0 |
| d | | 50.8 | 44.0 |
| Δν | | 8.11 | 9.09 |
| P | | 0.289 | 0.279 |
| (1) | $ΔS / f_3$ | 0.014 | 0.0229 |
| (2) | $f_3 / f_T$ | 0.410 | 0.332 |
| (3) | $bf_W / f_W$ | 3.193 | 2.692 |
| (5) | $L_P / f_W$ | 0.621 | −0.0058 |
| (10) | $d / f_W$ | 6.513 | 5.641 |
| (15) | $L_W / y$ | 15.486 | 13.319 |
| (16) | $|f_4| / f_W$ | 3.814 | 3.167 |
| (17) | $f_1 / (F_{nT} \cdot f_T)$ | 0.284 | 0.222 |
| (18) | $|f_2 / (F_{nT} \cdot f_T)|$ | 0.040 | 0.0345 |
| (19) | $φ / f_3$ | 0.458 | 0.459 |

TABLE 7

Embodiment 5
Various Lens Values

| No. | r | d | $ν_d$ | $n_d$ | $n_g$ |
|---|---|---|---|---|---|
| 1. | 56.7539 | 1.5000 | 23.01 | 1.860741 | 1.910649 |
| 2. | 30.5308 | 12.0000 | 65.42 | 1.603001 | 1.614372 |
| 3. | 581.6635 | 0.0500 | | | |
| 4. | 27.2253 | 7.0000 | 53.93 | 1.713000 | 1.729417 |
| 5. | 79.3611 | ($d_5$) | | | |
| *6. | 35.3746 | 1.0000 | 39.82 | 1.869940 | 1.897730 |
| 7. | 8.1163 | 4.3000 | | | |
| 8. | −15.9752 | 1.0000 | 45.37 | 1.796681 | 1.818801 |
| 9. | 15.0026 | 0.0500 | | | |
| 10. | 12.9949 | 3.7000 | 27.63 | 1.740771 | 1.776142 |
| 11. | −14.3934 | 0.5000 | | | |
| 12. | −12.6887 | 1.00000 | 45.37 | 1.796681 | 1.818801 |
| 13. | 12.4930 | 2.0000 | 30.04 | 1.698950 | 1.729431 |
| 14. | −102.5225 | ($d_{14}$) | | | |
| 15. | (Aperture stop) | 0.7000 | | | |
| 16. | 28.3613 | 4.2000 | 53.48 | 1.547390 | 1.560219 |
| 17. | −8.5437 | 1.0000 | 45.37 | 1.796681 | 1.818801 |
| 18. | −21.0250 | 0.0500 | | | |
| 19. | −42.2069 | 2.5000 | 64.10 | 1.516800 | 1.526703 |
| 20. | −15.7371 | ($d_{20}$) | | | |
| 21. | −27.0748 | 0.6000 | 52.30 | 1.748099 | 1.765893 |
| 22. | 45.2285 | 1.8000 | | | |
| 23. | 23.0689 | 1.0000 | 49.45 | 1.772789 | 1.792324 |
| 24. | 14.0001 | 4.0000 | 35.51 | 1.595071 | 1.616844 |
| 25. | 57.4489 | ($d_{25}$) | | | |
| 26. | 25.1038 | 4.5000 | 82.52 | 1.497820 | 1.505265 |
| 27. | −53.7101 | 0.5000 | | | |
| 28. | −106.8877 | 0.8000 | 27.63 | 1.740771 | 1.776142 |
| 29. | 19.8786 | 5.4000 | 67.87 | 1.593189 | 1.604034 |
| 30. | −52.9674 | 0.1000 | | | |
| 31. | 20.6453 | 4.2000 | 60.23 | 1.518350 | 1.528997 |
| *32. | −289.8800 | (bf) | | | |

TABLE 7-continued

Aspherical Surface Data

No. 6

κ = 1.0000  $C_4 = -7.40550 \times 10^{-6}$  $C_6 = -3.84200 \times 10^{-7}$
       $C_8 = -4.25680 \times 10^{-9}$  $C_{10} = 9.61370 \times 10^{-12}$ No. 32

κ = 1.0000  $C_4 = 3.47800 \times 10^{-5}$  $C_6 = 1.31740 \times 10^{-8}$
       $C_8 = -9.25880 \times 10^{-11}$  $C_{10} = 4.80680 \times 10^{-13}$ Variable Lens Separation Values

| | Wide-Angle End | Telephoto End |
|---|---|---|
| $d_5$ | 0.46148 | 19.55296 |
| $d_{14}$ | 10.49817 | 1.18183 |
| $d_{20}$ | 0.04866 | 21.06623 |
| $d_{25}$ | 9.40014 | 0.80897 |
| bf | 24.94325 | 33.53441 |

Anti-Vibration Data

The amount of movement for the second lens group  $G_2$: ΔS = 0.3
The amount of movement of the image   Wide-Angle End: −0.284
                    Telephoto End: −0.781

TABLE 8

Embodiment 6
Various Lens Values

| No. | r | d | $ν_d$ | $n_d$ | $n_g$ |
|---|---|---|---|---|---|
| 1. | (filter frame) | 3.000 | | | |
| 2. | ∞ | 2.5000 | 64.10 | 1.516800 | 1.526703 |
| 3. | ∞ | 1.2000 | | | |
| 4. | 77.0938 | 1.5000 | 23.01 | 1.860741 | 1.910649 |
| 5. | 43.2588 | 8.2000 | 60.03 | 1.640000 | 1.653133 |
| 6. | −593.1460 | 0.1000 | | | |
| 7. | 37.9264 | 5.2092 | 52.30 | 1.748099 | 1.765893 |
| 8. | 87.3198 | ($d_8$) | | | |
| *9. | 40.9413 | 1.2000 | 43.35 | 1.840421 | 1.864916 |
| 10. | 10.9488 | 6.3054 | | | |
| 11. | −13.6115 | 1.0107 | 43.35 | 1.840421 | 1.864916 |
| 12. | 442.1861 | 1.8370 | 30.04 | 1.698950 | 1.729431 |
| 13. | −17.8652 | 0.7754 | | | |
| 14. | −11.4552 | 1.3317 | 43.35 | 1.840421 | 1.864916 |
| 15. | 72.7457 | 2.0757 | 28.19 | 1.740000 | 1.774461 |
| 16. | −19.5184 | ($d_{16}$) | | | |
| 17. | (Aperture stop) | 3.0000 | | | |
| 18. | 29.2483 | 3.0289 | 70.41 | 1.487490 | 1.495932 |
| 19. | −9.6805 | 1.0000 | 49.45 | 1.772789 | 1.792324 |
| 20. | −18.4595 | 0.1000 | | | |
| 21. | −48.0813 | 2.1030 | 70.41 | 1.487490. | 1.495932 |
| 22. | −21.6423 | ($d_{22}$) | | | |
| 23. | −39.6851 | 1.0000 | 52.30 | 1.748099 | 1.765893 |
| 24. | 21.2904 | 0.1000 | | | |
| 25. | 22.1376 | 3.7124 | 32.17 | 1.672700 | 1.699894 |
| 26. | −14.5738 | 1.0000 | 53.93 | 1.713000 | 1.729417 |
| 27. | −278.6524 | ($d_{27}$) | | | |
| 28. | −888.0202 | 2.4857 | 60.23 | 1.518350 | 1.528997 |
| *29. | −29.8742 | 0.1000 | | | |
| 30. | 235.1578 | 1.0000 | 23.01 | 1.860741 | 1.910649 |
| 31. | 17.8846 | 4.0276 | 70.41 | 1.487490 | 1.495932 |
| 32. | −40.9855 | 0.4788 | | | |
| 33. | 20.0878 | 3.1541 | 70.41 | 1.487490 | 1.495932 |
| 34. | −63.8370 | (bf) | | | |

TABLE 8-continued

Aspherical Surface Data

No. 9

$\kappa = 1.0000$   $C^4 = 2.67150 \times 10^{-5}$   $C_6 = 3.73920 \times 10^{-8}$
               $C_8 = -4.56150 \times 10^{-10}$   $C_{10} = 6.64660 \times 10^{-12}$ No. 29

$\kappa = 1.0000$   $C_4 = -2.27310 \times 10^{-6}$   $C_6 = 7.17320 \times 10^{-9}$
               $C_8 = 8.08310 \times 10^{-10}$   $C_{10} = -6.44520 \times 10^{-12}$ Variable Lens Separation Values

|  | Wide-Angle End | Telephoto End |
| --- | --- | --- |
| $d_8$ | 0.83708 | 26.82256 |
| $d_{16}$ | 15.95351 | 0.46500 |
| $d_{22}$ | 1.54283 | 17.03134 |
| $d_{27}$ | 8.83053 | 1.84893 |
| bf | 25.88278 | 32.86437 |

Anti-Vibration Data

| | |
| --- | --- |
| The amount of movement for the second lens group | $G_2$: $\Delta S = 0.3$ |
| The amount of movement of the image | Wide-Angle End: −0.237 |
|  | Telephoto End: −0.759 |

The following Table 9 gives various values for each of the fifth and sixth embodiments related to the above-noted conditions (1) through (3), (5), (10), (15) through (18), and (22), and gives values for each of the conditions (1) through (3), (5), (10), (15) through (18), and (22).

TABLE 9

| Embodiment Number | | 5 | 6 |
| --- | --- | --- | --- |
| $\Delta S$ | | 0.3 | 0.3 |
| $bf_W$ | | 24.943 | 25.883 |
| $f_W$ | | 7.800 | 8.000 |
| $f_T$ | | 52.500 | 52.500 |
| $L_W$ | | 85.858 | 83.000 |
| y | | 5.5 | 5.5 |
| $f_1$ | | 43.325 | 54.000 |
| $f_2$ | | −6.123 | −8.160 |
| $f_3$ | | 21.530 | 24.800 |
| $f_4$ | | −29.749 | −42.250 |
| $f_5$ | | 20.857 | 23.600 |
| $L_P$ | | 5.015 | −2.650 |
| $F_{nT}$ | | 2.89 | 2.89 |
| $\phi$ | | 17.28 | 21.51 |
| d | | 50.8 | 50.0 |
| $\Delta v$ | | 8.11 | 20.96 |
| P | | −0.785 | −0.4775 |
| (1) | $\Delta S / \| f_2 \|$ | 0.0490 | 0.0368 |
| (2) | $\| f_2 \| / f_T$ | 0.117 | 0.155 |
| *(3) | $bf_W / f_W$ | 3.198 | 3.235 |
| (5) | $L_P / f_W$ | 0.643 | −0.331 |
| (10) | $d / f_W$ | 6.513 | 6.250 |
| (15) | $L_W / y$ | 15.611 | 16.309 |
| (16) | $\| f_4 \| / f_W$ | 3.814 | 3.167 |
| (17) | $f_1 / (F_{nT} \cdot f_T)$ | 0.286 | 0.356 |
| (18) | $\| f_2 / (F_{nT} \cdot f_T) \|$ | 0.0404 | 0.0538 |
| (22) | $\phi / \| f_2 \|$ | 2.822 | 2.636 |

Figures 3, 3A, 3B:
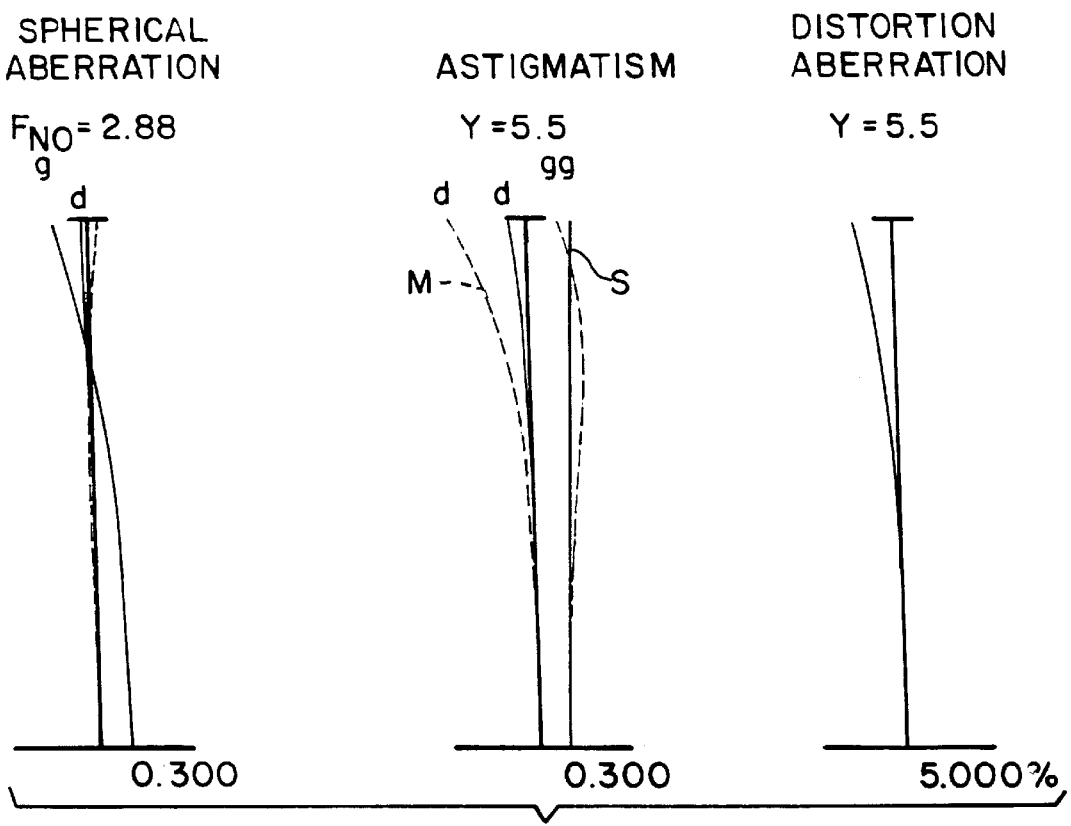
FIG. 3 shows, various aberration diagrams in the telephoto state of the first embodiment.
Figure 6:
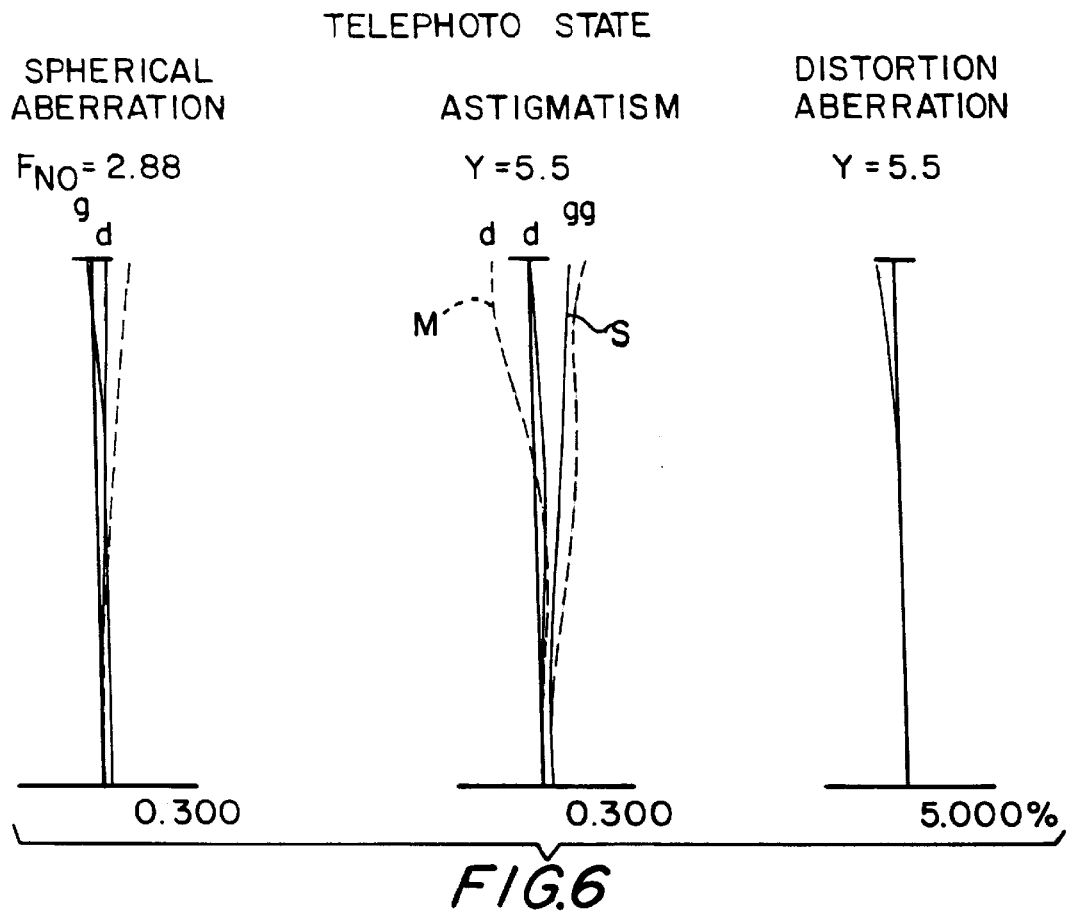
FIG. 6 shows various aberration diagrams in the telephoto state of the second embodiment.
Figures 6A, 6B:
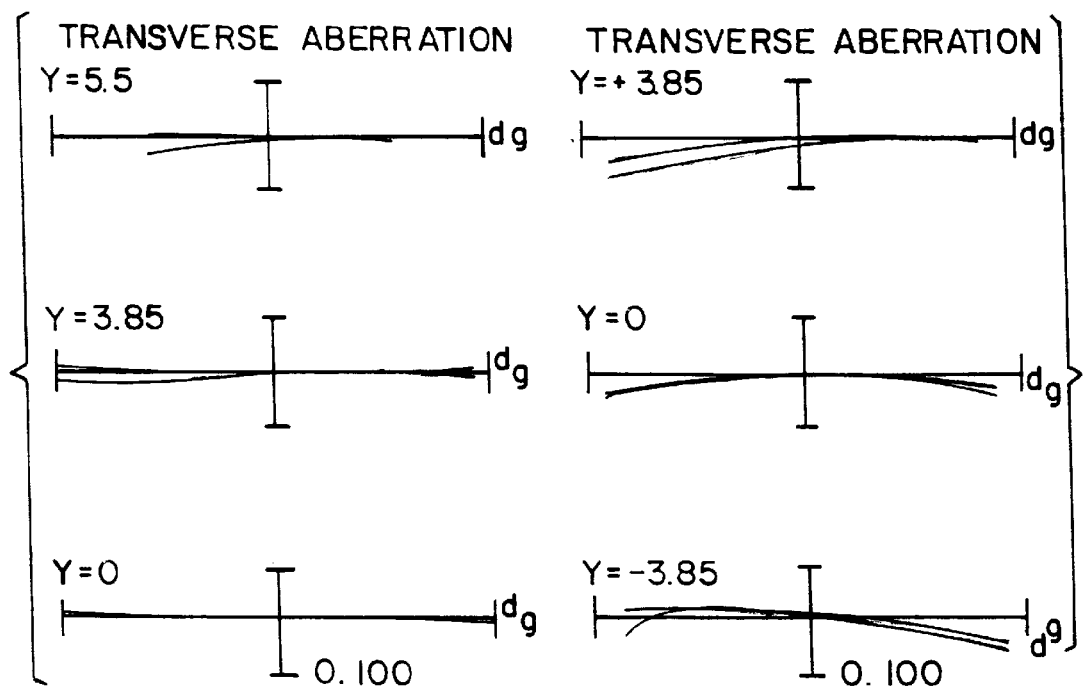
Figure 10:
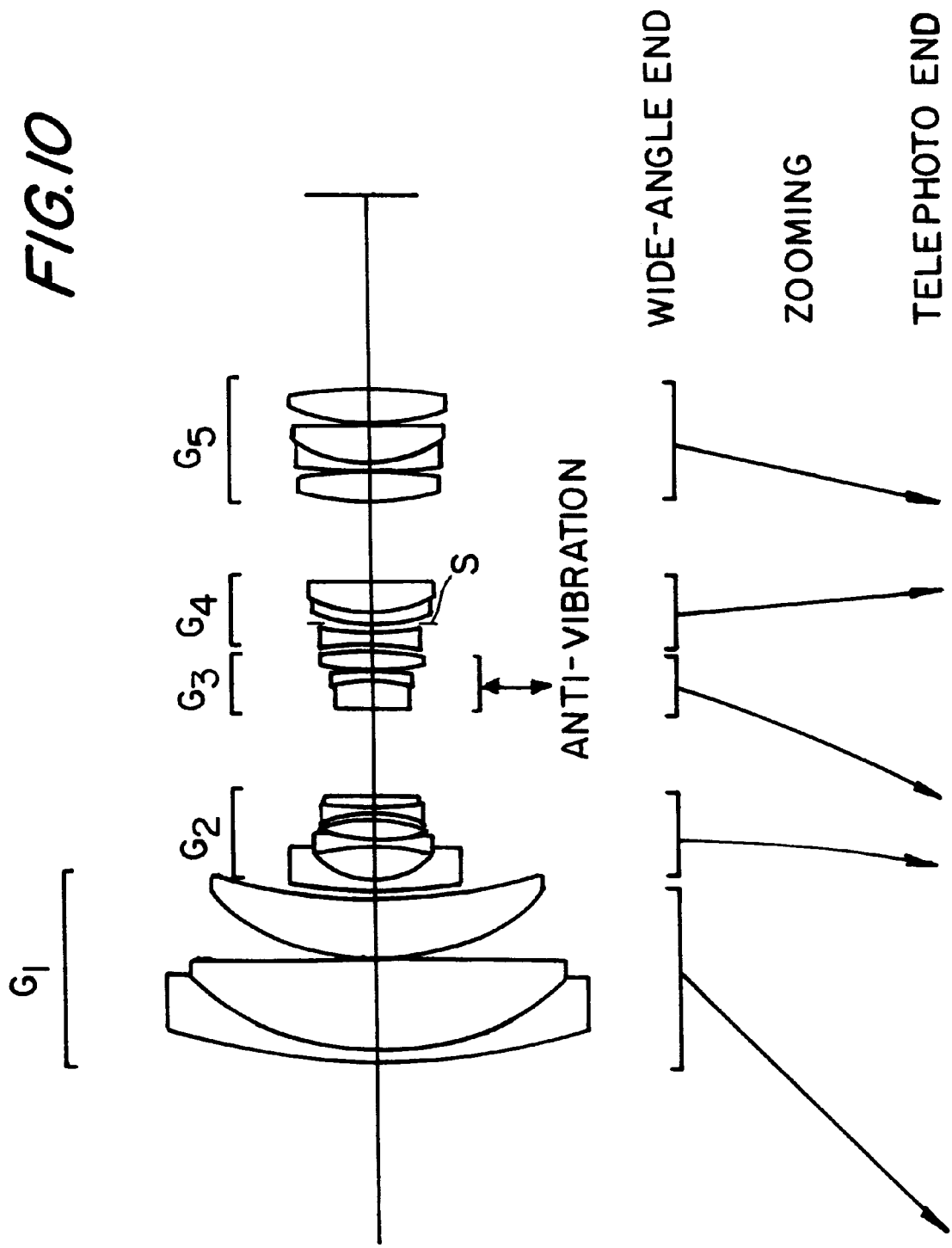
FIG. 10 is a drawing showing the structure of the zoom lens system according to a fourth embodiment of the present invention.

FIG. 2 and FIG. 3 show spherical aberration, astigmatism, distortion aberration, and transverse aberration for the wide-angle state and the telephoto state of the first embodiment, respectively. Transverse aberration (A) shows the situation when the fourth lens group $G_4$ is arranged on the optical axis, and transverse aberration (B) shows the situation when the fourth lens group $G_4$ moves only by $\Delta S$ in a direction substantially perpendicular to the optical axis and anti-vibration correction is performed. Similarly, FIG. 5 and FIG. 6 show various aberrations for the wide-angle state and the telephoto state of the second embodiment, respectively.

Figure 12:
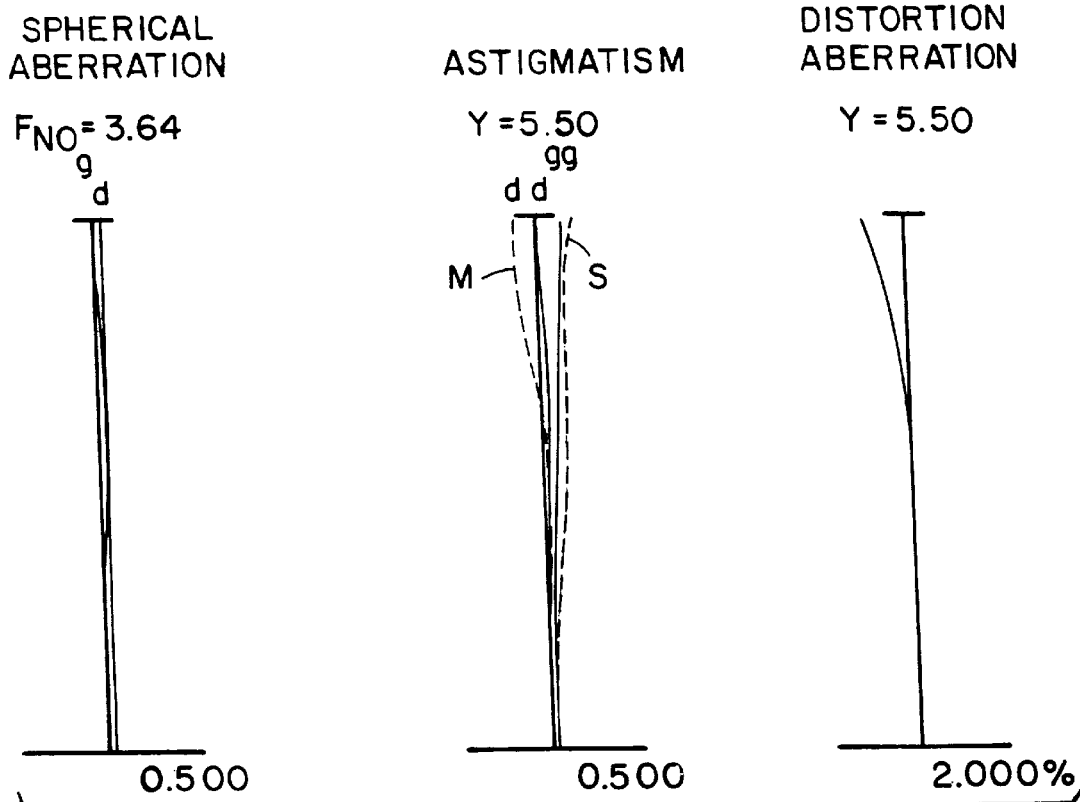
FIG. 12 shows various aberration diagrams in the telephoto state of the fourth embodiment.
Figures 12A, 12B:
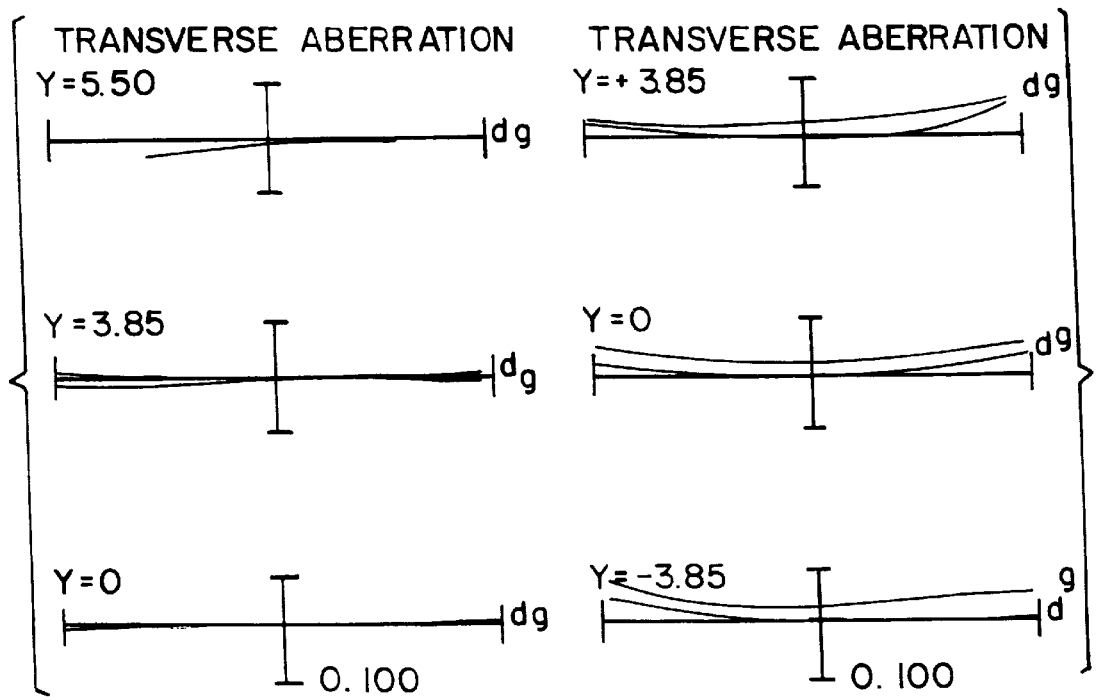

FIG. 8 and FIG. 9 show spherical aberration, astigmatism, distortion aberration, and transverse aberration for the wide-angle state and the telephoto state of the third embodiment, respectively. Transverse aberration (A) shows the situation when the third lens group $G_3$ is arranged on the optical axis, and transverse aberration (B) shows the situation when the third lens group $G_3$ moves only by $\Delta S$ in a direction substantially perpendicular to the optical axis and anti-vibration correction is performed. Similarly, FIG. 11 and FIG. 12 show various aberrations for the wide-angle state and the telephoto state of the fourth embodiment, respectively.

Figure 15:
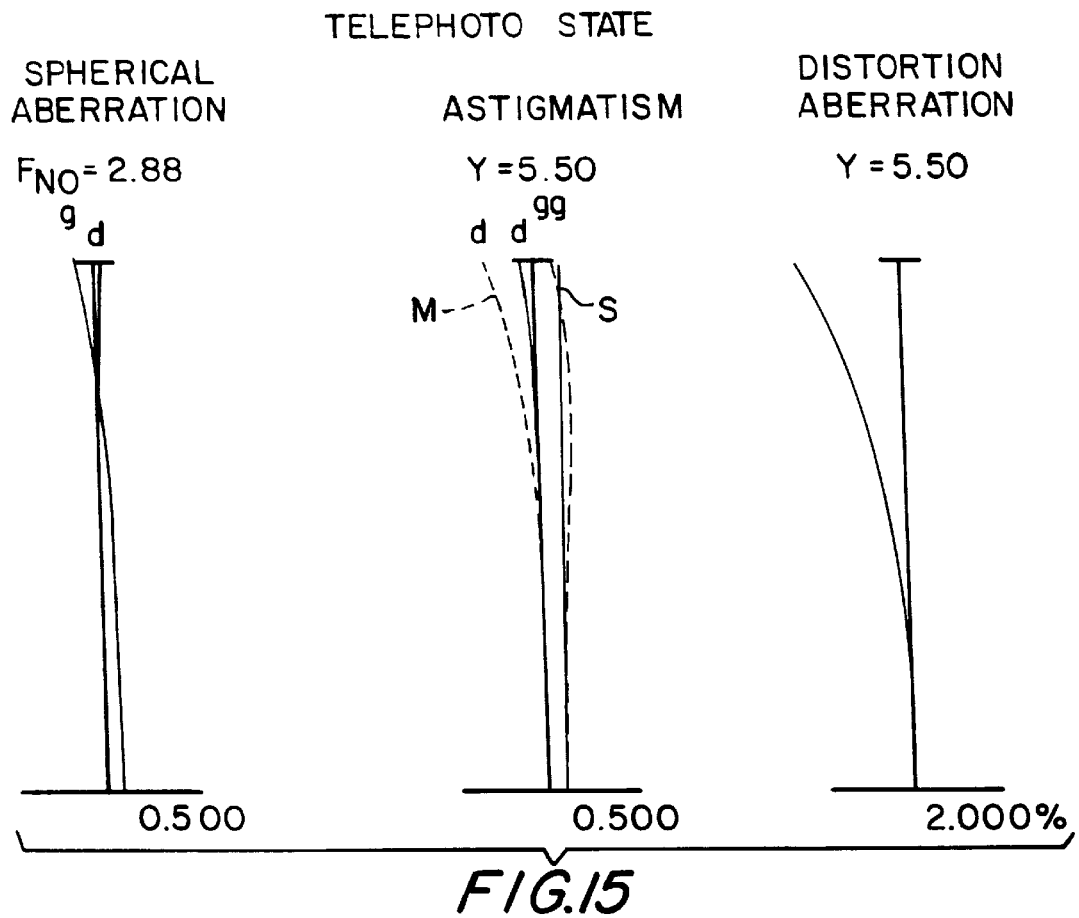
FIG. 15 shows various aberration diagrams in the telephoto state of the fifth embodiment.
Figures 15A, 15B:
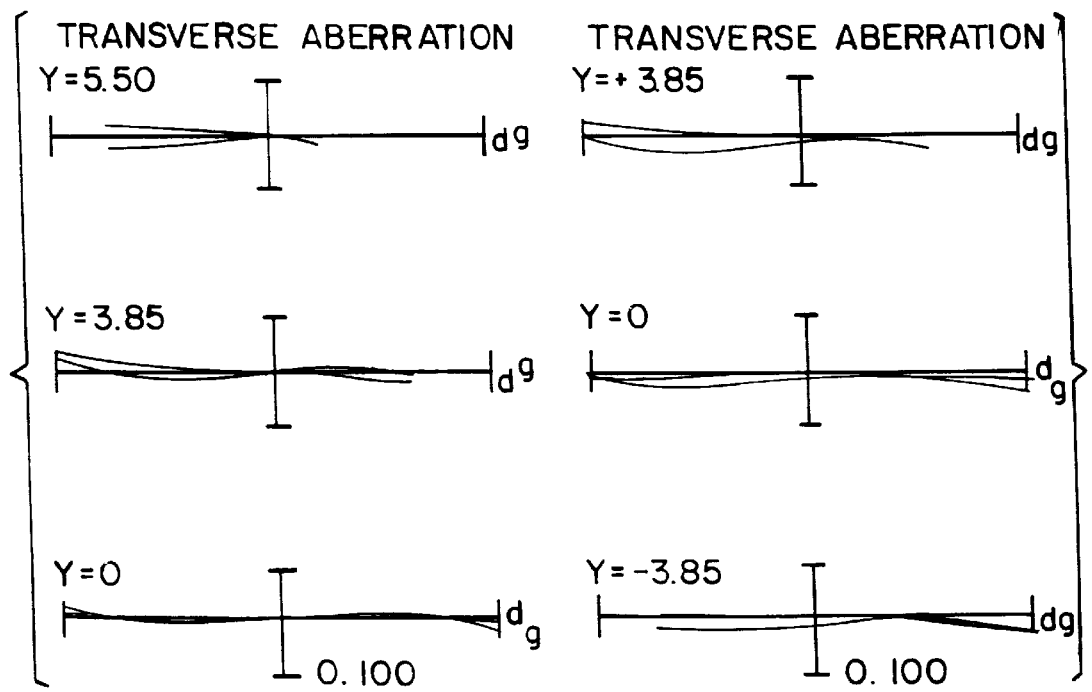
Figure 17:
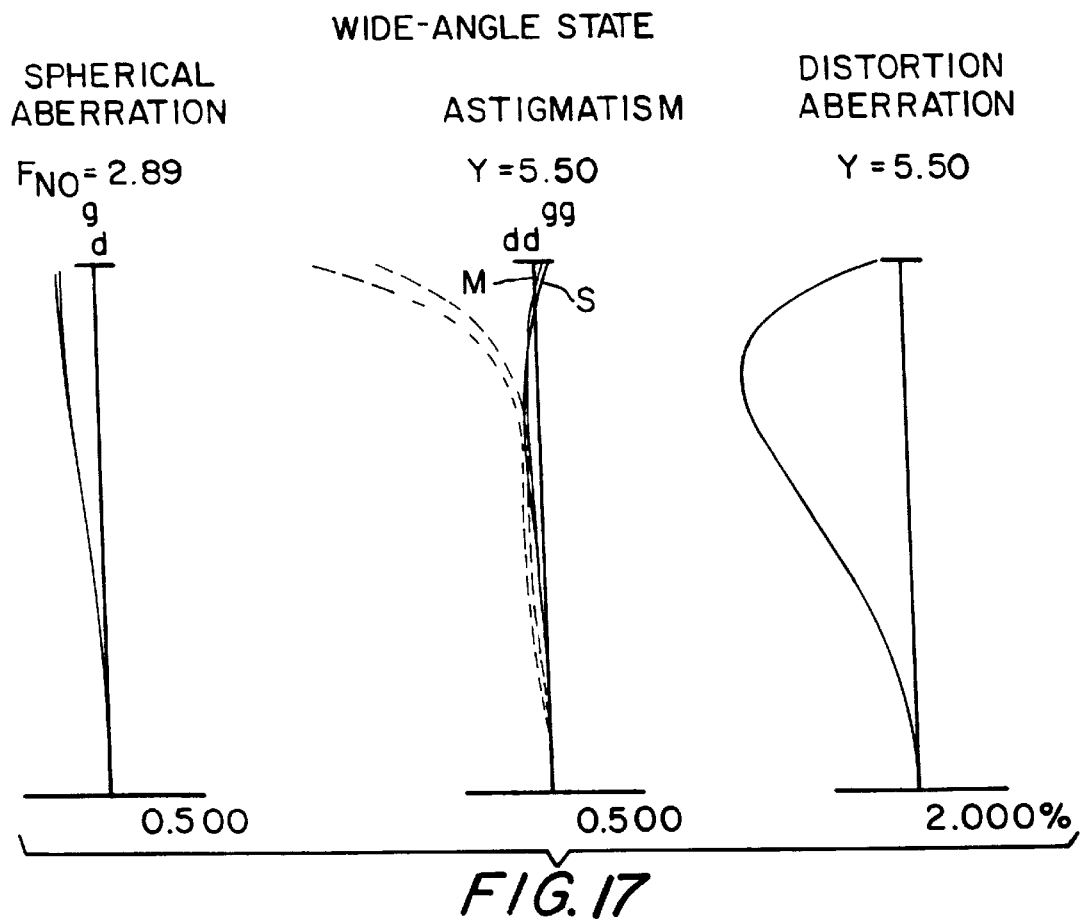
FIG. 17 shows various aberration diagrams in the wide-angle state of the sixth embodiment.
Figures 17A, 17B:
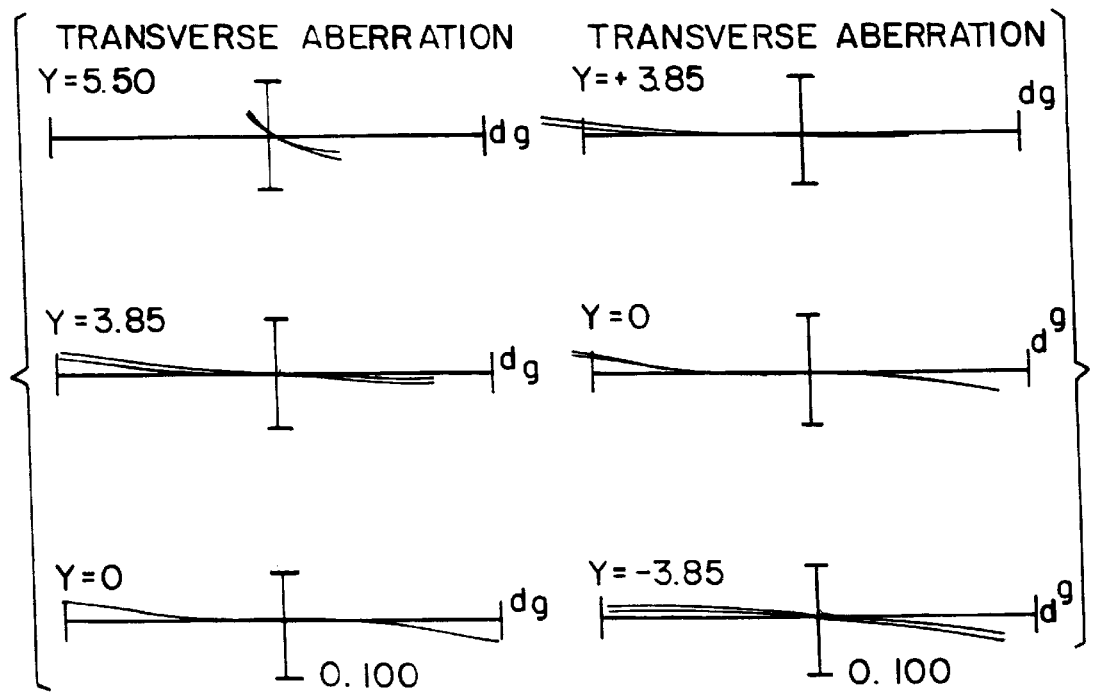

FIG. 14 and FIG. 15 show spherical aberration, astigmatism, distortion aberration, and transverse aberration for the wide-angle state and the telephoto state of the fifth embodiment, respectively. Transverse aberration (A) shows the situation when the second lens group $G_2$ is arranged on the optical axis, and transverse aberration (B) shows the situation when the second lens group $G_2$ moves only by $\Delta S$ in a direction substantially perpendicular to the optical axis and anti-vibration correction is performed. Similarly, FIG. 17 and FIG. 18 show various aberrations for the wide-angle state and the telephoto state of the sixth embodiment, respectively.

In each aberration diagram, $F_{NO}$ is the F-number and Y is the image height. In each astigmatism diagram, the solid line S indicates the sagittal image plane and the broken line M indicates the meridional image plane.

As is clear from all of the aberration diagrams, all six embodiments satisfactorily correct various aberrations at any focal length.

By using the principles of the present invention as described above it is possible to provide a bright zoom lens system equipped with an antivibration function that includes wide angles, and which is small in size and has high performance and high magnification. Sufficient back focus and telecentricity can also be ensured. Auto focus is also possible if a focus detection function is incorporated.

Various modifications will become possible for those skilled in the art after receiving the teachings of the present disclosure without departing from the scope thereof.

What is claimed is:

1. A zoom lens system with an anti-vibration function and comprising, in order from the object end:

a first lens group having a positive refractive power;

a second lens group having a negative refractive power;

a third lens group having a positive refractive power;

a fourth lens group having a negative refractive power; and a fifth lens group having a positive refractive power, and whose focal length at the wide-angle end is shorter than the diagonal length of the image plane of the zoom lens system;

whereby at least one lens group selected from said first and fifth lens groups moves toward said object end and all of the distances between each of said lens groups are changed when zooming from the wide-angle end to the telephoto end, and at least one lens group selected from said second, third and fourth lens groups moves in a direction substantially perpendicular to the optical axis of the zoom lens system when preventing vibration.

2. A zoom lens system, as claimed in claim 1, wherein at least said first lens group moves toward said object end when zooming from said wide-angle end to said telephoto end and said fourth lens group moves in a direction substantially perpendicular to said optical axis when preventing vibration.

3. A zoom lens system, as claimed in claim 2, wherein each of the following condition is satisfied:

$$\Delta S/|f_4|<0.1$$

$$0.3<|f_4|/f_T<1.5$$

where:
- $\Delta S$ is the maximum amount of movement by said fourth lens group in a direction substantially perpendicular to said optical axis when preventing vibration;
- $f_4$ is the focal length of said fourth lens group; and
- $f_T$ is the focal length of the entire zoom lens system at the telephoto end.

4. A zoom lens system, as claimed in claim 3, wherein the following condition is satisfied:

$$1.5<bf_W/f_W<7.0$$

where:
- $bf_W$ is the back focus at the wide-angle end; and
- $f_W$ is the focal length of the entire zoom lens system at the wide-angle end.

5. A zoom lens system, as claimed in claim 4, wherein the following condition is satisfied:

$$0.3<f_5/f_W<5$$

where:
- $f_5$ is the focal length of said fifth lens group; and
- $f_W$ is the focal length of the entire system at the wide-angle end.

6. A zoom lens system, as claimed in claim 3, wherein the following condition is satisfied:

$$0.3<f_5/f_W<5$$

where:
- $f_5$ is the focal length of said fifth lens group; and
- $f_W$ is the focal length of the entire system at the wide-angle end.

7. A zoom lens system, as claimed in claim 2, wherein the following condition is satisfied:

$$1.5<bf_W/f_W<7.0$$

where:
- $bf_W$ is the back focus at the wide-angle end; and
- $f_W$ is the focal length of the entire zoom lens system at the wide-angle end.

8. A zoom lens system, as claimed in claim 7, wherein the following condition is satisfied:

$$0.3<f_5/f_W<5$$

where:
- $f_5$ is the focal length of said fifth lens group; and
- $f_W$ is the focal length of the entire system at the wide-angle end.

9. A zoom lens system, as claimed in claim 2, wherein the following condition is satisfied:

$$0.3<f_5/f_W<5$$

where:

$f_5$ is the focal length of said fifth lens group; and $f_W$ is the focal length of the entire system at the wide-angle end.

10. A zoom lens system, as claimed in claim 1, wherein at least said fifth lens group moves toward said object end when zooming from said wide-angle end to said telephoto end and said third lens group moves in a direction substantially perpendicular to said optical axis when preventing vibration.

11. A zoom lens system, as claimed in claim 10, wherein each of the following condition is satisfied:

$$\Delta S/f_3<0.1$$

$$0.1<f_3/f_T<1.5$$

where:
- $\Delta S$ is the maximum displacement in a direction substantially perpendicular to the optical axis moved by said third lens group when preventing vibration;
- $f_3$ is the focal length of said third lens group; and
- $f_T$ is the focal length of the entire system at the telephoto end.

12. A zoom lens system, as claimed in claim 11, wherein the following condition is satisfied:

$$2.0<bf_W/f_W<8.0$$

where:
- $bf_W$ is the back focus at the wide-angle end; and
- $f_W$ is the focal length of the entire system at the wide-angle end.

13. A zoom lens system, as claimed in claim 12, wherein each of the following conditions is satisfied:

$$4.5<L_W/y<20.0$$

$$0.3<|f_4|/f_W<5.0$$

where:
- $L_W$ is the length from the first lens surface to the final lens surface at the wide-angle end;
- $y$ is the maximum image height;
- $f_4$ is the focal length of said fourth lens group; and
- $f_W$ is the focal length of the entire system at the wide-angle end.

14. A zoom lens system, as claimed in claim 11, wherein each of the following conditions is satisfied:

$$4.5<L_W/y<20.0$$

$$0.3<|f_4|/f_W<5.0$$

where:
- $L_W$ is the length from the first lens surface to the final lens surface at the wide-angle end;
- $y$ is the maximum image height;
- $f_4$ is the focal length of said fourth lens group; and
- $f_W$ is the focal length of the entire system at the wide-angle end.

15. A zoom lens system, as claimed in claim 10, wherein the following condition is satisfied:

$$2.0<bf_W/f_W<8.0$$

where:
- $bf_W$ is the back focus at the wide-angle end; and $f_W$ is the focal length of the entire system at the wide-angle end.

16. A zoom lens system, as claimed in claim 15, wherein each of the following conditions is satisfied:

$$4.5 < L_W/y < 20.0$$

$$0.3 < |f_4|/f_W < 5.0$$

where:
- $L_W$ is the length from the first lens surface to the final lens surface at the wide-angle end;
- y is the maximum image height;
- $f_4$ is the focal length of said fourth lens group; and
- $f_W$ is the focal length of the entire system at the wide-angle end.

17. A zoom lens system, as claimed in claim 10, wherein each of the following conditions is satisfied:

$$4.5 < L_W/y < 20.0$$

$$0.3 < |f_4|/f_W < 5.0$$

where:
- $L_W$ is the length from the first lens surface to the final lens surface at the wide-angle end;
- y is the maximum image height;
- $f_4$ is the focal length of said fourth lens group; and
- $f_W$ is the focal length of the entire system at the wide-angle end.

18. A zoom lens system, as claimed in claim 1, wherein at least said fifth lens group moves toward said object end when zooming from said wide-angle end to said telephoto end and said second lens group moves in a direction substantially perpendicular to said optical axis when preventing vibration.

19. A zoom lens system, as claimed in claim 18, wherein each of the following conditions is satisfied:

$$\Delta S/f_2 < 0.1$$

$$0.05 < f_2/f_T < 1.5$$

where:
- $\Delta S$ is the maximum displacement in a direction substantially perpendicular to the optical axis moved by said second lens group when preventing vibration;
- $f_2$ is the focal length of said second lens group; and
- $f_T$ is the focal length of the entire system at the telephoto end.

20. A zoom lens system, as claimed in claim 19, wherein the following condition is satisfied:

$$2.0 < bf_W/f_W < 8.0$$

where:
- $bf_W$ is the back focus at the wide-angle end; and
- $f_W$ is the focal length of the entire system at the wide-angle end.

21. A zoom lens system, as claimed in claim 20, wherein each of the following conditions is satisfied:

$$4.5 < L_W/y < 20.0$$

$$0.3 < |f_4|/f_W < 5.0$$

where:
- $L_W$ is the length from the first lens surface to the final lens surface at the wide-angle end;
- y is the maximum image height;
- $f_4$ is the focal length of said fourth lens group; and
- $f_W$ is the focal length of the entire system at the wide-angle end.

22. A zoom lens system, as claimed in claim 19, wherein each of the following conditions is satisfied:

$$4.5 < L_W/y < 20.0$$

$$0.3 < |f_4|/f_W < 5.0$$

where:
- $L_W$ is the length from the first lens surface to the final lens surface at the wide-angle end;
- y is the maximum image height;
- $f_4$ is the focal length of said fourth lens group; and
- $f_W$ is the focal length of the entire system at the wide-angle end.

23. A zoom lens system, as claimed in claim 18, wherein the following condition is satisfied:

$$2.0 < bf_W/f_W < 8.0$$

where:
- $bf_W$ is the back focus at the wide-angle end; and
- $f_W$ is the focal length of the entire system at the wide-angle end.

24. A zoom lens system, as claimed in claim 23, wherein each of the following conditions is satisfied:

$$4.5 < L_W/y < 20.0$$

$$0.3 < |f_4|/f_W < 5.0$$

where:
- $L_W$ is the length from the first lens surface to the final lens surface at the wide-angle end;
- y is the maximum image height;
- $f_4$ is the focal length of said fourth lens group; and
- $f_W$ is the focal length of the entire system at the wide-angle end.

25. A zoom lens system, as claimed in claim 18, wherein each of the following conditions is satisfied:

$$4.5 < L_W/y < 20.0$$

$$0.3 < |f_4|/f_W < 5.0$$

where:
- $L_W$ is the length from the first lens surface to the final lens surface at the wide-angle end;
- y is the maximum image height;
- $f_4$ is the focal length of said fourth lens group; and
- $f_W$ is the focal length of the entire system at the wide-angle end.

* * * * *